United States Patent
Shimada et al.

(10) Patent No.: US 8,278,865 B2
(45) Date of Patent: Oct. 2, 2012

(54) CONTROL DEVICE

(75) Inventors: Arinori Shimada, Anjo (JP); Mitsuru Nakamura, Anjo (JP); Subrata Saha, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 281 days.

(21) Appl. No.: 12/872,513

(22) Filed: Aug. 31, 2010

(65) Prior Publication Data

US 2011/0080131 A1   Apr. 7, 2011

(30) Foreign Application Priority Data

Oct. 2, 2009 (JP) ................. 2009-231024

(51) Int. Cl.
*H02P 27/04* (2006.01)

(52) U.S. Cl. ........ 318/503; 318/807; 318/808; 318/809; 318/810; 318/811

(58) Field of Classification Search .................. 318/503, 318/807–811, 494
See application file for complete search history.

(56) References Cited

U.S. PATENT DOCUMENTS 5,506,765 A * 4/1996 Nakata et al. .................. 363/98

FOREIGN PATENT DOCUMENTS

| JP | A-6-327294 | 11/1994 |
| JP | A-2002-10668 | 1/2002 |
| JP | B2-3890907 | 3/2007 |

OTHER PUBLICATIONS

International Search Report issued in International Application No. PCT/JP2010/064933 mailed on Oct. 26, 2010 (w/English Translation).

* cited by examiner

*Primary Examiner* — Bentsu Ro
*Assistant Examiner* — David Luo
(74) *Attorney, Agent, or Firm* — Oliff & Berridge, PLC

(57) ABSTRACT

A control device that controls a plurality of inverters respectively provided corresponding to a plurality of alternating-current electric motors so as to control the plurality of alternating-current electric motors by current feedback. The control device comprises a carrier frequency setting unit that individually selects and sets one of a plurality of carrier frequencies, each of which is a frequency of a carrier for generating switching control signals for the inverter based on a pulse width modulation method, for each of the plurality of inverters, and a switching timing table that specifies a switching timing serving as a permissible timing of switching to a different carrier frequency pair from each of a plurality of carrier frequency pairs each of which is composed of a combination of the carrier frequencies set for each of the plurality of inverters.

6 Claims, 19 Drawing Sheets

FIG.6

| | CARRIER FREQUENCY Fc2 | | | | |
|---|---|---|---|---|---|
| | 10kHz | 7.5kHz | 5kHz | 2.5kHz | 1.25kHz |
| CARRIER FREQUENCY Fc1 — 10kHz | | | | d | c |
| 7.5kHz | a  b | | | | |
| 5kHz | | | | | |
| 2.5kHz | | | | | |
| 1.25kHz | | | | | |

FIG. 7A   CARRIER FREQUENCY MG1: 10kHz, MG2: 10kHz
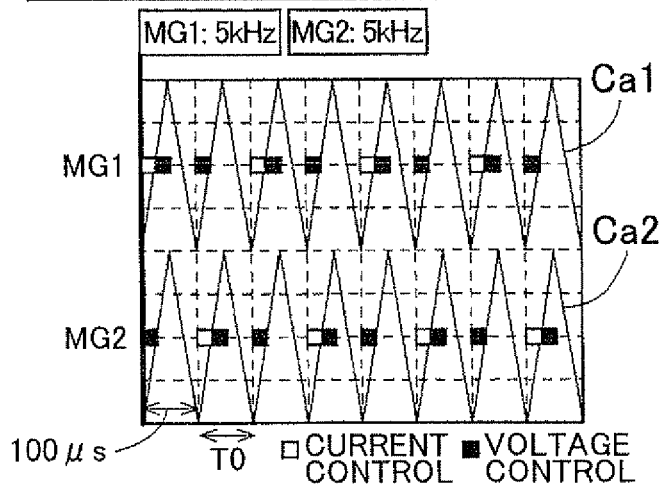
FIG. 7B   CARRIER FREQUENCY MG1: 7.5kHz, MG2: 10kHz
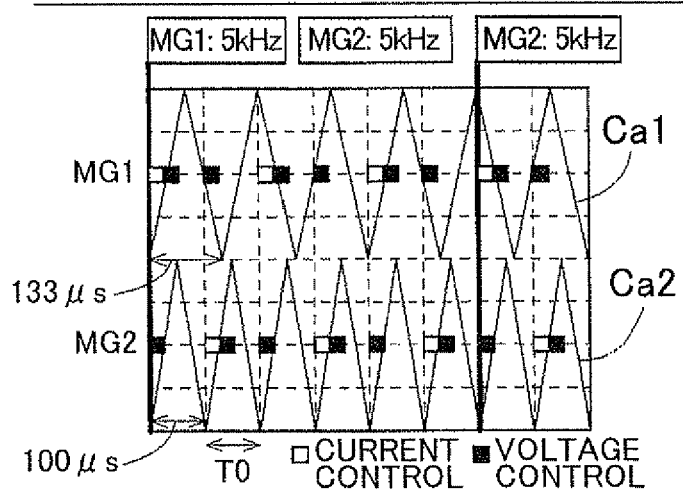
FIG. 7C   CARRIER FREQUENCY MG1: 5kHz, MG2: 10kHz
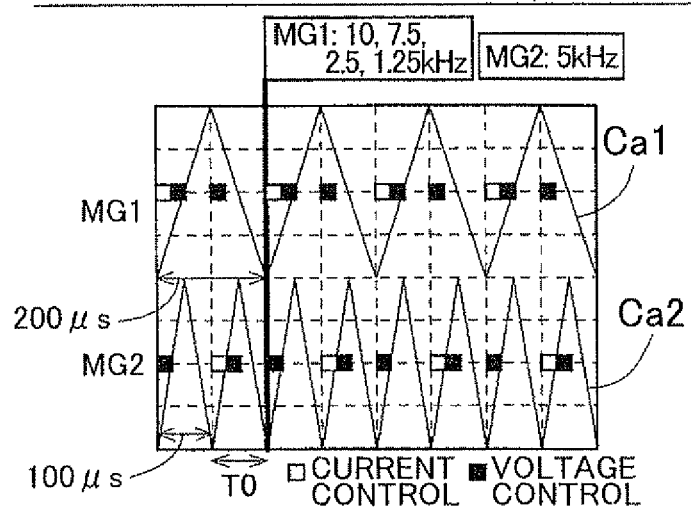

CONTROL DEVICE

INCORPORATION BY REFERENCE

The disclosure of Japanese Patent Application No. 2009-231024 filed on Oct. 2, 2009 including the specification, drawings and abstract is incorporated herein by reference in its entirety.

BACKGROUND OF THE INVENTION

The present invention relates to a control device that controls a plurality of inverters respectively provided corresponding to a plurality of alternating-current electric motors so as to control the plurality of alternating-current electric motors by current feedback.

DESCRIPTION OF THE RELATED ART

There is already known a control device that controls a plurality of inverters respectively provided corresponding to a plurality of alternating-current electric motors so as to control the plurality of alternating-current electric motors by current feedback. In such current feedback control, a feedback control calculation is performed based on deviations between current detection values obtained by detecting currents flowing in each of the alternating-current electric motors and current command values determined based on a required torque for each of the alternating-current electric motors. Therefore, current detection processing for detecting the currents flowing in each of the alternating-current electric motors needs to be executed repeatedly.

Regarding the current detection processing such as mentioned above, for example, Japanese Patent Publication No. 3890907 listed below discloses a structure in which the current detection processing for each of two alternating-current electric motors is performed at each of mutually different times and in the same cycle as each other. Specifically, the patent document discloses the structure in which the current detection processing for each of the two alternating-current electric motors is alternately performed in an execution cycle that is twice or an integer n times longer than the cycle of a carrier (carrier wave) for generating switching control signals for an inverter based on a PWM (pulse width modulation) method.

SUMMARY OF THE INVENTION

In order to reduce a loss in the inverter and a loss in the alternating-current electric motor, an optimal carrier frequency exists for the alternating-current electric motor depending on an operating point determined by torque, rotational speed, and so on. Therefore, from the viewpoint of energy efficiency, it is desirable to structure the control device for controlling the plurality of alternating-current electric motors so as to be capable of switching the carrier frequency for the inverter corresponding to each of the alternating-current electric motors depending on the operating point of each of the alternating-current electric motors.

However, in the structure disclosed in Japanese Patent Publication No. 3890907, an identical carrier frequency is set for both of the two inverters corresponding to the two alternating-current electric motors. Thus, Japanese Patent Publication No. 3890907 does not disclose a structure that can switch the carrier frequency. Note that the carrier is provided for sequentially generating PWM pulses based on comparison with a command value for an alternating-current voltage, and switching of the switching control signal between a high level and a low level is not performed when the carrier is at a maximum or a minimum. Therefore, in the structure such as given in Japanese Patent Publication No. 3890907, it may be considered to be sufficient to switch the carrier frequency in accordance with the maximum value or the minimum value of the carrier. However, as a result of keen study, the inventors of the present invention have found that a current surge may occur at the switching of the carrier frequency, or a current ripple may occur after the switching of the carrier frequency if no other measures are taken than switching the carrier frequency in accordance with the maximum value or the minimum value of the carrier.

Consequently, it is desired to realize a control device in which the current surge at the switching of the carrier frequency and the current ripple after the switching of the carrier frequency are suppressed from occurring.

A control device according to a first aspect of the present invention that controls a plurality of inverters respectively provided corresponding to a plurality of alternating-current electric motors so as to control the plurality of alternating-current electric motors by current feedback has a characteristic structure in which: current detection processing to detect currents flowing in coils of each of the plurality of alternating-current electric motors is cyclically performed at times synchronized with a predetermined standard calculation cycle and mutually different from each other; the control device includes a carrier frequency setting unit that individually selects and sets one of a plurality of carrier frequencies, each of which is a frequency of a carrier for generating switching control signals for the inverter based on a pulse width modulation method, for each of the plurality of inverters, and a switching timing table that specifies a switching timing serving as a permissible timing of switching to a different carrier frequency pair from each of a plurality of carrier frequency pairs each of which is composed of a combination of the carrier frequencies set for each of the plurality of inverters; the switching timing table is a table specifying the switching timing so that the current detection processing for each of the plurality of alternating-current electric motors is performed in accordance with a maximum value or a minimum value of the carrier that is set for the inverter corresponding to each of the alternating-current electric motors; and the carrier frequency setting unit switches the setting of the carrier frequency based on the switching timing obtained from the switching timing table.

According to the characteristic structure as described above, after the switching of the carrier frequency, the current detection processing for each of the plurality of alternating-current electric motors is performed in accordance with the maximum value or the minimum value of the carrier that is set for the inverter corresponding to each of the alternating-current electric motors. Because switching of the switching control signal between a high level and a low level is not performed when the carrier is at the maximum value or the minimum value, the current detection processing can be performed for each of the alternating-current electric motors at a time when an influence of switching noise is low, thereby enabling to suppress the noise from being included in the current values detected in the current detection processing. Therefore, the current feedback control that is performed based on the current values detected in the current detection processing can be stabilized, and the current surge at the switching of the carrier frequency and the current ripple after the switching of the carrier frequency can be suppressed from occurring.

In addition, the control device is provided with the switching timing table specifying the switching timing of the carrier frequency, and the carrier frequency setting unit can obtain the switching timing only by referring to the switching timing table so as to switch the setting of the carrier frequency. Therefore, the structure of the carrier frequency setting unit can be simplified, and a calculation load of a calculation processing unit provided in the control device can be suppressed from greatly increasing at the switching of the carrier frequency.

The switching timing table may specify the switching timing based on a relation between a phase in a cycle of the current detection processing for each of the plurality of alternating-current electric motors and a phase of the carrier that is set for the inverter corresponding to each of the alternating-current electric motors.

According to this structure, even if the cycle of the current detection processing differs from the cycle of the carrier, the switching timing can be specified by appropriately taking into account the relation between the timing of the current detection processing and the timing of the maximum value or the minimum value of the carrier. In addition, the carrier frequency setting unit can determine the switching timing based on the switching timing table only by obtaining the information on the phase in the cycle of the current detection processing and the phase of the carrier. Therefore, the structure of the carrier frequency setting unit can be simplified.

The switching timing table may specify the switching timing so that a relation of phase on a time axis between the carrier frequencies in each of the plurality of carrier frequency pairs coincides with a predetermined relation for each of the carrier frequency pairs.

According to this structure, it is not necessary to consider a different phase relation between the carrier frequencies on the time axis with respect to the same carrier frequency pair. Therefore, the number of the switching timings specified by the switching timing table for the carrier frequency pairs can be limited to a small value, thereby enabling to simplify the structure of the switching timing table. It should be noted that, although there is a case in which the relation of phase on the time axis between the carrier frequencies is set to a predetermined relation in advance for purposes such as reducing the current ripple, this structure is also suitable for such a case.

The switching timing table may be provided for both a timing of switching from a predetermined standard carrier frequency to other carrier frequency and a timing of switching from the carrier frequency other than the standard carrier frequency to the standard carrier frequency, and the carrier frequency setting unit may perform frequency switching through the standard carrier frequency when switching between carrier frequencies other than the standard carrier frequency.

According to this structure, it is sufficient to specify only the switching timing between the standard carrier frequency and another carrier frequency, and it is unnecessary to specify any switching timing between carrier frequencies other than the standard carrier frequency. Therefore, the number of the switching timings specified by the switching timing table for the carrier frequency pairs can be limited to a small value, thereby enabling to simplify the structure of the switching timing table. This structure is particularly suitable for the case in which there is a frequently selected carrier frequency, and in that case, it is preferable that the frequently selected carrier frequency serve as the standard carrier frequency.

In the structure in which the carrier frequency setting unit performs frequency switching through the standard carrier frequency when switching between carrier frequencies other than the standard carrier frequency, the carrier frequency setting unit may perform frequency switching without passing through the standard carrier frequency when switching from a carrier frequency of N times (where N is an integer of two or more) the standard carrier frequency to a carrier frequency other than the standard carrier frequency.

There is a case in which the switching timing from a carrier frequency of N times (where N is an integer of two or more) the standard carrier frequency to the standard carrier frequency coincides with the switching timing from the standard carrier frequency to a carrier frequency other than the standard carrier frequency (carrier frequency after switching). According to this structure, in such a case, the frequency switching can be performed from the carrier frequency of N times (where N is an integer of two or more) the standard carrier frequency to the carrier frequency after switching based on the switching timing from the standard carrier frequency to the carrier frequency after switching. Therefore, the carrier frequency can be switched quickly while limiting the number of the switching timings provided in the switching timing table to a small value.

Current control processing, in which current feedback control calculation is performed based on deviations between current command values determined based on a required torque for each of the alternating-current electric motors and current detection values detected by the current detection processing, may be executed within the standard calculation cycle immediately after the current detection processing that is executed in accordance with the maximum value or the minimum value of the carrier.

According to this structure, the current detection values detected by the current detection processing can be reflected quickly to the current control processing. In addition, as described above, the current detection processing is cyclically performed for each of the plurality of alternating-current electric motors at times synchronized with the predetermined standard calculation cycle and mutually different from each other. Therefore, according to this structure, the current feedback control calculation can be prevented from being performed more than once within the same standard calculation cycle. Consequently, the timings of performing the current feedback control calculation with a relatively large calculation load can be dispersed along the time axis, thereby enabling to suppress the calculation load of the calculation processing unit from being temporally nonuniform to a great extent. Accordingly, a maximum value of the calculation load taken into account when designing the calculation processing unit provided in the control device can be limited to a low value, thereby enabling to suppress an increase in cost and size of the calculation processing unit.

BRIEF DESCRIPTION OF THE DRAWINGS

FIG. 6 is a diagram showing carrier frequency pairs according to the embodiment of the present invention;

FIGS. 7A to 7E are diagrams conceptually showing a switching timing table according to the embodiment of the present invention;

DETAILED DESCRIPTION OF THE EMBODIMENTS

Figure 1:
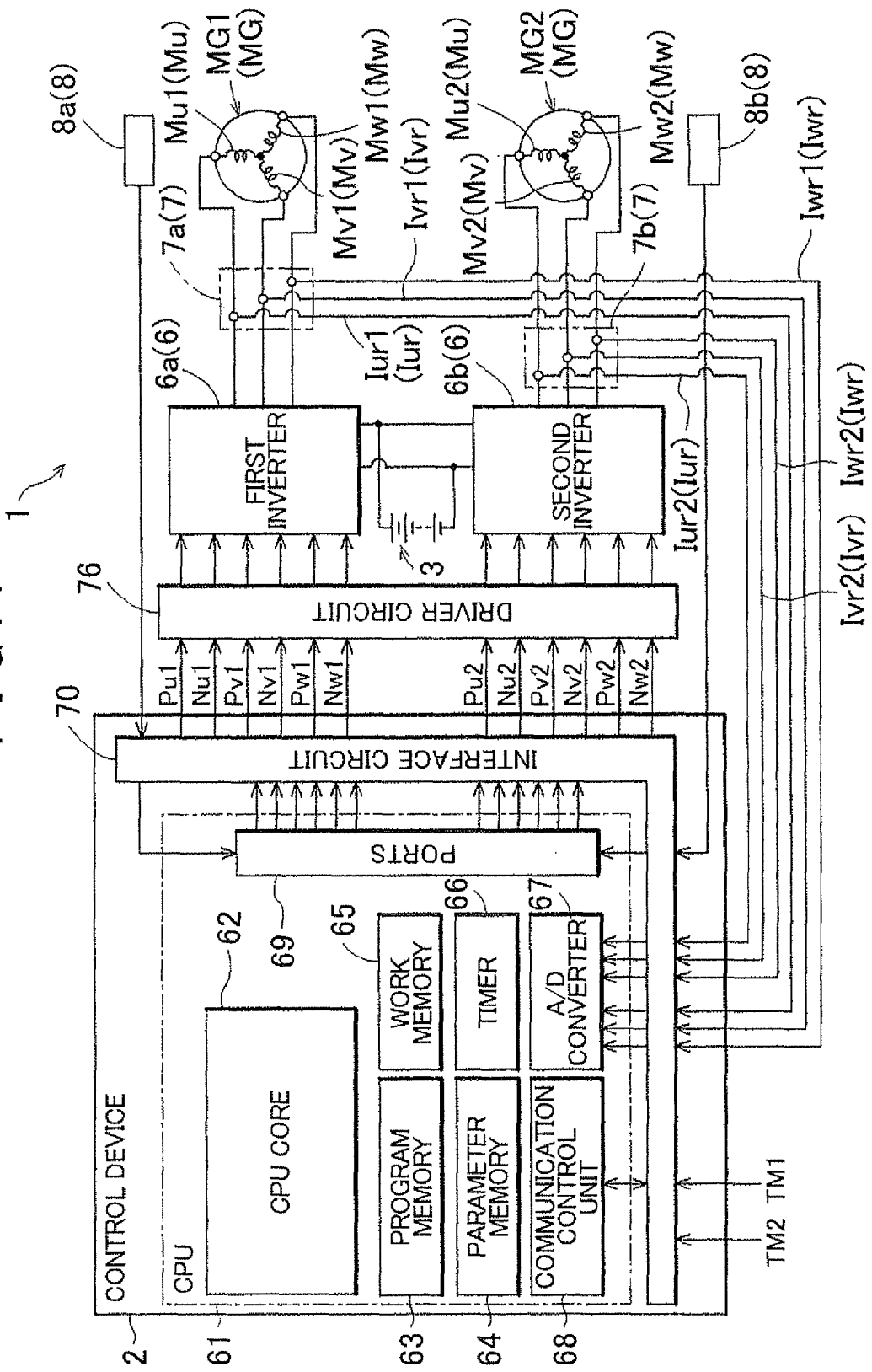
FIG. 1 is a block diagram schematically showing an example of a system structure of a vehicle including a control device according to an embodiment of the present invention.
Figure 2:
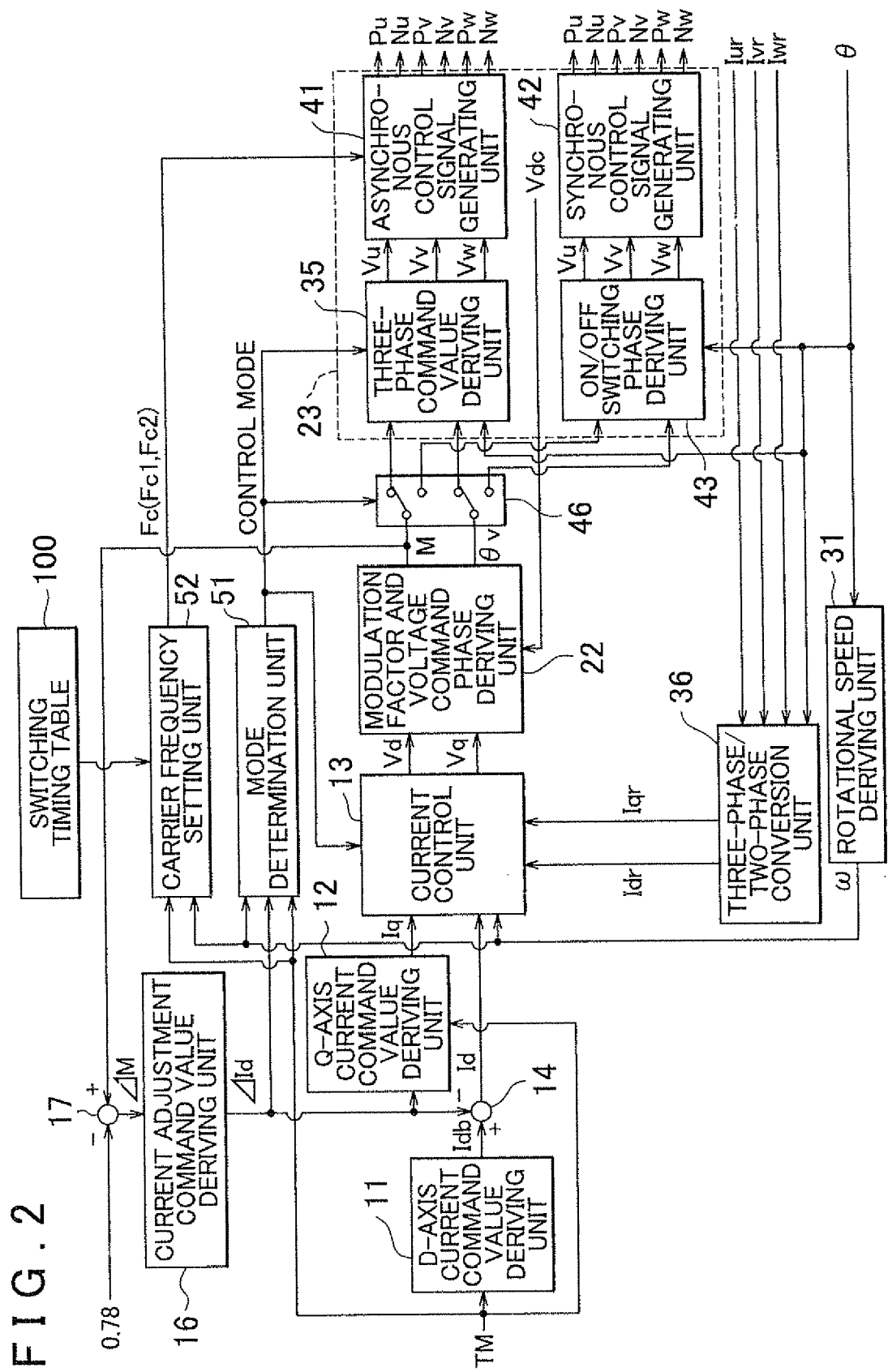
FIG. 2 is a functional block diagram of the control device according to the embodiment of the present invention.

An embodiment of a control device 2 according to the present invention will be described with reference to the accompanying drawings. As shown in FIG. 1, in the present embodiment, an example will be described in which an electric motor drive apparatus 1 serving as a controlled object of the control device 2 is structured as an apparatus to drive and control two synchronous electric motors MG1 and MG2 (IPMSM, hereinafter may be collectively referred simply to as "electric motors MG") of an internal magnet structure serving as alternating-current electric motors operated by three-phase alternating current. The electric motors MG are structured so as to operate also as generators as required. The electric motors MG are used, for example, as a source of driving force of an electric vehicle or a hybrid vehicle. The electric motor drive apparatus 1 is structured to have inverters 6 that convert a direct-current voltage Vdc into alternating-current voltages and supply them to the electric motors MG. In the present embodiment, as shown in FIG. 2, the control device 2 controls the electric motor drive apparatus 1 to control the electric motors MG by current feedback using a vector control method.

In the structure described above, the control device 2 according to the present embodiment has a characteristic structure in which a carrier frequency Fc, which is a frequency of a carrier Ca for generating switching control signals for the inverters 6 based on a pulse width modulation (PWM) method, can be switched, and the control device 2 includes a switching timing table 100 (refer to FIG. 2) specifying a switching timing of the carrier frequency Fc. In the structure a carrier frequency setting unit 52 switches the setting of the carrier frequency Fc based on the switching timing obtained from the switching timing table 100, as well as in the structure of the switching timing table 100. Consequently, the control device 2 is realized in which a current surge at the switching of the carrier frequency Fc and a current ripple after the switching of the carrier frequency Fc can be suppressed from occurring. The electric motor drive apparatus 1 and the control device 2 according to the present embodiment will be described below in detail.

1. Hardware Structure of Electric Motor Drive Apparatus and Control Device

First, the hardware structure of the electric motor drive apparatus 1 and the control device 2 according to the present embodiment will be described based on FIG. 1. As shown in FIG. 1, in the present embodiment, two three-phase synchronous electric motors of a first electric motor MG1 and a second electric motor MG2 are provided as controlled objects. The first electric motor MG1 and the second electric motor MG2 may be either electric motors of the same performance or those of different performances. The electric motors MG1 and MG2 are connected to a direct-current power supply 3 generating the direct-current voltage Vdc via a first inverter 6a and a second inverter 6b (hereinafter may be collectively referred simply to as "inverters 6"), respectively. As the direct-current power supply 3, any of various secondary batteries such as a nickel metal hydride secondary battery and a lithium ion secondary battery, a capacitor, or a combination thereof is used. The direct-current voltage Vdc that is a voltage of the direct-current power supply 3 is detected by a voltage sensor (not shown) to be supplied to the control device 2. It is also preferable to have a structure provided with smoothing capacitors for smoothing the direct-current voltage Vdc from the direct-current power supply 3 or converters for raising the direct-current voltage Vdc from the direct-current power supply 3 interposed between the direct-current power supply 3 and the inverters 6.

The inverters 6 convert the direct-current voltage Vdc from the direct-current power supply 3 into the three-phase alternating voltages and supply them to the electric motors MG. The three-phase alternating voltages thus supplied drive the electric motors MG. That is, the inverters 6 serve as DC/AC conversion units. Each of the inverters 6 is structured to have a plurality of switching elements (not shown). It is suitable to apply, for example, an IGBT (insulated gate bipolar transistor) or a MOSFET (metal oxide semiconductor field effect transistor) to the switching element. Description will be made below of an example in which the IGBT is used as the switching element.

The inverters 6 (6a and 6b) are formed of a three-phase bridge circuit. Two of the IGBTs are connected in series between a positive input side and a negative input side of the inverters 6, and three of these series circuits are connected in parallel. That is, the bridge circuit is structured such that one set of the series circuit corresponds to each of stator coils Mu (Mu1 and Mu2), Mv (Mv1 and Mv2), and Mw (Mw1 and Mw2) corresponding to a u-phase, a v-phase, and a w-phase of the electric motors MG (MG1 and MG2). A collector of the IGBT on the upper side of each phase is connected to the positive input side of the inverters 6, and an emitter is connected to a collector of the IGBT on the lower side. An emitter of the IGBT on the lower side of each phase is connected to the negative input side (such as ground) of the inverters 6. Middle points of the series circuits formed by a pair of IGBTs of each phase, that is, the connection point between the IGBTs is connected to the corresponding one of the stator coils Mu, Mv, and Mw of the electric motors MG.

A free-wheel diode (regenerative diode) is connected in parallel with each of the IGBTs. The free-wheel diode is connected in parallel with the IGBT in a manner in which a cathode terminal is connected to the collector terminal of the IGBT, and an anode terminal is connected to the emitter terminal of the IGBT. A gate of each of the IGBTs is connected to the control device 2 via a driver circuit 76, and individually switching-controlled.

The control device 2 controls the plurality (two here) of inverters 6 (6a and 6b) provided in the electric motor drive apparatus 1. The control device 2 is structured as ECU (electronic control unit) composed of a microcomputer of other logic circuit as a core. In the present embodiment, the control device 2 is structured to have a CPU (central processing unit) 61 that is a single-task microcomputer, an interface circuit 70, and other peripheral circuitry. The CPU 61 is a computer that executes electric motor control processing, such as current control processing and voltage control processing, to be described later. The interface circuit 70 is composed of EMI (electro-magnetic interference) prevention components, a buffer circuit, and others. The switching control signals that are driving signals input to the gates of the IGBTs or the MOSFETs serving as switching elements for switching high voltage require a higher voltage than a driving voltage of a general electronic circuit such as a microcomputer. Therefore, the switching control signals are raised to a higher voltage level via the driver circuit 76, and then input to the inverters 6.

The CPU 61 is structured to have at least a CPU core 62, a program memory 63, a parameter memory 64, a work memory 65, a timer 66, an A/D converter 67, a communication control unit 68, and ports 69. The CPU core 62 is a core of the CPU 61, and structured to have an instruction register and an instruction decoder, an ALU (arithmetic logic unit) serving as a main unit for various calculations, flag registers, general registers, an interrupt controller, and others. In the present embodiment, the CPU 61 is provided with the single CPU core 62 (single calculation processing unit). The CPU core 62 serves as a core of the single-task computer executing a program in a serial manner.

The program memory 63 is a non-volatile memory in which an electric motor control program is stored. The parameter memory 64 is a non-volatile memory in which various parameters are stored to be referred to when executing the program. The parameter memory 64 may be built without distinction from the program memory 63. The program memory 63 and the parameter memory 64 are suitably structured, for example, with a flash memory or the like. The work memory 65 is a memory that temporarily stores temporary data while executing the program. The work memory 65 that may be volatile is structured with a DRAM (dynamic RAM) or a SRAM (static RAM) that can be read and written at a high speed.

The timer 66 measures time on the basis of a predetermined clock cycle. The timer 66 monitors the execution cycle of the program assuming as a standard calculation cycle T0, for example, a half of the cycle of the carrier Ca (in the example of the present embodiment, the cycle of the carrier Ca corresponding to a standard carrier frequency to be described later) of the switching control signals to be described later, and notifies the interrupt controller of the CPU core 62 of the execution cycle. The A/D converter 67 converts analog electrical signals into digital data. In the present embodiment, the A/D converter 67 receives current detection values Iur (Iur1 and Iur2), Ivr (Ivr1 and Ivr2), and Iwr (Iwr1 and Iwr2) that are detection values of currents flowing in the stator coils Mu, Mv, and Mw of the electric motors MG from current sensors 7 (7a and 7b), and converts the current detection values into digital data. It should be noted that, because the three phases of the u-phase, the v-phase, and the w-phase are balanced so as to have an instantaneous value of zero, the currents of only two phases may be detected, and the current of the remaining one phase may be obtained through calculation by the CPU 61. The present embodiment exemplifies a case in which all of the three phases are detected. Note that, in the case of detecting the currents of only two phases and obtaining the remaining one phase by calculation in the CPU 61, the A/D converter 67 is sufficient to have only four analog inputs.

The communication control unit 68 controls communication with other systems in a vehicle. In the present embodiment, the communication control unit 68 controls communication with a travel control system, sensors, and others via a CAN (controller area network) (not shown) in the vehicle. For example, the CPU 61 receives motor control commands including required torques TM for the electric motors MG from the travel control system via the communication control unit 68, and controls the electric motors MG based on the received commands. In the present embodiment, the CPU 61 receives a required torque TM1 for the first electric motor MG1 and a required torque TM2 for the second electric motor MG2 (hereinafter may be collectively referred simply to as "required torques TM"). The CPU 61 is also suitably structured to be connected to a brake system or a power steering system via the communication control unit 68 to control these systems.

The ports 69 serve as a terminal control unit that outputs the switching control signals and others of the inverters 6 via terminals of the CPU 61, and receives rotation detection signals to be input to the CPU 61 from rotation sensors 8 (8a and 8b). In FIG. 1, a reference symbol P* of a signal input from the interface circuit 70 into the driver circuit 76 represents the control signal of the IGBT on the upper side of the inverters 6, and a reference symbol N* represents a control signal of the IGBT on the lower side. Reference symbols *u, *v, and *w represent the control signals of the IGBTs of the u-phase, the v-phase, and the w-phase, respectively, of the inverters 6. Reference symbols *1 and *2 represent the IGBT control signals as switching control signals for the first inverter 6a of the first electric motor MG1 and the second inverter 6b of the second electric motor MG2, respectively. The rotation sensors 8 are sensors each of which is provided near each of the electric motors MG to detect a magnetic pole position $\theta$ indicating a rotational angle of a rotor of the electric motor MG, and structured, for example, using a resolver. Here, the magnetic pole position $\theta$ is assumed to represent the rotational angle of the rotor as an electric angle.

As described above, the electric motor drive apparatus 1 according to the present embodiment controls the two electric motors MG1 and MG2, and has the two inverters 6 (first inverter 6a and second inverter 6b) corresponding to the two electric motors MG1 and MG2, respectively. The control device 2 is structured so as to control the two electric motors MG1 and MG2 by controlling the two inverters 6a and 6b. In this case, the control device 2 is structured so as to control the two inverters 6a and 6b by using the CPU core 62 serving as the single calculation processing unit.

1-2. Software Structure of Control Device

Next, the software structure of the control device 2 will be described. It should be noted that, in the present embodiment, the electric motor drive apparatus 1 drives and controls the two electric motors MG1 and MG2 and has the two inverters 6a and 6b corresponding to the electric motors MG1 and MG2, respectively. In correspondence to this, the control device 2 is provided with functional units each of which corresponds to each of the two inverters 6a and 6b, and each of the two electric motors MG1 and MG2. However, because the structure is the same, only the functional unit that controls one of the inverters 6 and one of the electric motors MG will be described below. As shown in FIG. 2, the control device 2 controls the electric motor drive apparatus 1 provided with the electric motor MG and the inverter 6 by current feedback control using the vector control method. In the vector control, the current feedback control is performed by converting through coordinate transformation the coil current flowing in each of the stator coils of three phases of the alternating-current electric motor MG into two-phase vector components on a d-axis in the direction of a magnetic field generated by a permanent magnet arranged in the rotor and on a q-axis perpendicular to the d-axis.

When performing the coordinate transformation in the vector control, the rotational state of the electric motor MG must always be detected. Accordingly, in the present embodiment, as shown in FIG. 1, the rotational sensor 8 such as a resolver is provided near the electric motor MG. The magnetic pole position θ as a result of the detection is input to the control device 2. As described above, the magnetic pole position θ is an electric angle. The required torque TM is also input to the control device 2. Then, depending on the required torque TM, the magnetic pole position θ, and a rotational speed ω of the electric motor MG derived from the magnetic pole position θ, the control device 2 generates and outputs the control signals Pu, Nu, Pv, Nv, Pw, and Nw for driving the electric motor MG to drive-control the inverter 6. The control signals Pu, Nu, Pv, Nv, Pw, and Nw are switching control signals for causing the switching elements of the inverter 6 to perform switching operation in accordance with one of a plurality of control modes to be described later, and specifically, gate drive signals for driving the gates of the switching elements.

The required torque TM is input to a d-axis current command value deriving unit 11. The d-axis current command value deriving unit 11 derives a basic d-axis current command value Idb based on the input required torque TM. Here, the basic d-axis current command value Idb corresponds to a command value of a d-axis current when maximum torque control is performed. Note that the maximum torque control is control to adjust a current phase so as to maximize an output torque of the electric motor MG for the same current. In the present embodiment, the d-axis current command value deriving unit 11 is structured to use a table specifying a relation between the value of the required torque TM and the basic d-axis current command value so as to derive the basic d-axis current command value Idb corresponding to the value of the required torque TM. The basic d-axis current command value Idb thus derived is input to a subtractor 14. A d-axis current adjustment command value ΔId derived by a current adjustment command value deriving unit 16 to be described later is also input to the subtractor 14. The subtractor 14 subtracts the d-axis current adjustment command value ΔId from the basic d-axis current command value Idb to derive an eventual d-axis current command value Id as shown in a formula (1) below.

$$Id = Idb - \Delta Id \qquad (1)$$

The required torque TM and the d-axis current adjustment command value ΔId are input to a q-axis current command value deriving unit 12. The q-axis current command value deriving unit 12 derives a q-axis current command value Iq based on the required torque TM and the d-axis current adjustment command value ΔId thus input. In the present embodiment, the q-axis current command value deriving unit 12 uses at least a table specifying a relation between the value of the required torque TM and the d-axis current adjustment command value ΔId so as to derive the q-axis current command value Iq corresponding to the required torque TM and the d-axis current adjustment command value ΔId. The d-axis current command value Id and the q-axis current command value Iq thus derived are command values of the two-phase current having the mutually perpendicular vector components for driving the electric motor MG. Accordingly, in the present embodiment, the d-axis current command value Id and the q-axis current command value Iq correspond to "current command values" in the present invention.

The d-axis current command value Id and the q-axis current command value Iq are input to a current control unit 13. In addition, a d-axis current detection value Idr and a q-axis current detection value Iqr are input from a three-phase/two-phase conversion unit 36, and the rotational speed ω of the electric motor MG is also input from a rotational speed deriving unit 31 to the current control unit 13. The three-phase/two-phase conversion unit 36 performs three-phase/two-phase conversion to derive the d-axis current detection value Idr and the q-axis current detection value Iqr based on the current detection values (three-phase current detection values: the u-phase current detection value Iur, the v-phase current detection value Ivr, and the w-phase current detection value Iwr) detected by the current sensor 7 (refer to FIG. 1) detecting the currents actually flowing in the stator coils (Mu, Mv, and Mw) of the electric motor MG and the magnetic pole position θ detected by the rotation sensor 8 (refer to FIG. 1). The rotational speed deriving unit 31 derives the rotational speed ω of the electric motor MG based on the magnetic pole position θ detected by the rotation sensor 8 (refer to FIG. 1).

The current control unit 13 performs current control processing that determines two-phase voltage command values Vd and Vq serving as first voltage command values based on deviations between the two-phase current command values that are the d-axis current command value Id and the q-axis current command value Iq and the two-phase current detection values (d-axis current detection value Idr and q-axis current detection value Iqr) obtained by applying the three-phase/two-phase conversion to the current detection values Iur, Ivr, and Iwr. That is, the current control unit 13 is a functional unit to perform a current feedback control calculation based on the deviations between the current command values determined based on the required torque TM for the electric motor MG and the current detection values detected by the current detection processing. In this case, the current control unit 13 determines the two-phase voltage command values Vd and Vq at least by performing proportional control and integral control based on the deviations. Specifically, the current control unit 13 derives a d-axis current deviation δId that is a deviation between the d-axis current command value Id and the d-axis current detection value Idr, and a q-axis current deviation Iqr that is a deviation between the q-axis current command value Iq and the q-axis current detection value Iqr. Then, the current control unit 13 derives a basic d-axis voltage command value Vzd by performing a proportional-integral control calculation (PI control calculation) based on the d-axis current deviation δId, and also derives a basic q-axis voltage command value Vzq by performing the proportional-integral control calculation based on the q-axis current deviation δIq. Note that it is also preferable to perform proportional-integral-derivative control calculations (PID control calculations) instead of the proportional-integral control calculations.

Then, the current control unit 13 derives the d-axis voltage command value Vd by performing an adjustment of subtracting a q-axis armature reaction Eq from the basic d-axis voltage command value Vzd, as shown in a formula (2) below.

$$\begin{aligned} Vd &= Vzd - Eq \qquad (2) \\ &= Vzd - \omega \cdot Lq \cdot Iqr \end{aligned}$$

As shown in the formula (2), the q-axis armature reaction Eq is derived based on the rotational speed ω of the electric motor MG, the q-axis current detection value Iqr, and a q-axis inductance Lq.

Moreover, the current control unit 13 derives the q-axis voltage command value Vq by performing an adjustment of adding a d-axis armature reaction Ed and an induced voltage Em generated by an armature interlinkage magnetic flux of the permanent magnet to the basic q-axis voltage command value Vzq, as shown in a formula (3) below.

$$Vq = Vzq + Ed + Em \qquad (3)$$
$$= Vzq + \omega \cdot Ld \cdot Idr + \omega \cdot MIf$$

As shown in the formula (3), the d-axis armature reaction Ed is derived based on the rotational speed ω of the electric motor MG, the d-axis current detection value Idr, and a d-axis inductance Ld. In addition, the induced voltage Em is derived based on an induced voltage constant MIf determined by an effective value of the armature interlinkage magnetic flux of the permanent magnet and on the rotational speed ω of the electric motor MG.

The d-axis voltage command value Vd and the q-axis voltage command value Vq are input to a modulation factor and voltage command phase deriving unit 22. The direct-current voltage Vdc detected by the voltage sensor (not shown) is also input to the modulation factor and voltage command phase deriving unit 22. Based on the input d-axis voltage command value Vd and the q-axis voltage command value Vq, and on the direct-current voltage Vdc, which are input as described above, the modulation factor and voltage command phase deriving unit 22 derives a modulation factor M and a voltage command phase θv as second voltage command values. Here, the modulation factor M represents a ratio of an effective value of a fundamental wave component of an output voltage waveform of the inverter 6 to the direct-current voltage Vdc. In the example of the present embodiment, the modulation ratio M is derived as a ratio of an effective value of the two-phase voltage command values Vd and Vq to the direct-current voltage Vdc. Specifically, the modulation factor M is calculated according to a formula (4) given below.

$$M = \sqrt{(Vd^2 + Vq^2)}/Vdc \qquad (4)$$

The voltage command phase θv is a phase angle of a voltage vector represented by the two-phase voltage command values Vd and Vq, and corresponds to an angle formed by a resultant voltage vector generated by combining a d-axis voltage vector with respect to the d-axis voltage command value Vd with a q-axis voltage vector with respect to the q-axis voltage command value Vq, and by the d-axis voltage vector with respect to the d-axis voltage command value Vd. In the example of the present embodiment, the voltage command phase θv is calculated according to a formula (5) given below.

$$\theta v = \tan^{-1}(Vq/Vd) \qquad (5)$$

The voltage command phase θv corresponds to a phase of an origin of the u-phase voltage command value Vu with reference to an origin (θ=0°) of the magnetic pole position θ.

It should be noted that, in the electric motor MG, as the rotational speed ω increases, the induced voltage increases, and an alternating-current voltage (hereinafter referred to as "required voltage") required to drive the electric motor MG also increases. Then, when the required voltage exceeds a maximum alternating-current voltage (hereinafter referred to as "maximum output voltage") capable of being output from the inverter 6 by converting the direct-current voltage Vdc at that time, necessary currents for the stator coils cannot flow, thereby being unable to control the electric motor MG appropriately. For that reason, the control device 2 is structured so as to perform so-called field-weakening control that adjusts the current phase (ahead of that of the maximum torque control) so that a magnetic flux in the direction of weakening a field flux of the electric motor MG is generated from the stator coil. Therefore, in the present embodiment, the control device 2 is structured such that the d-axis current adjustment command value ΔId is derived based on the modulation factor M derived by the modulation factor and voltage command phase deriving unit 22, and based on the d-axis current adjustment command value ΔId thus derived, the basic d-axis current command value Idb and the q-axis current command value Iq are adjusted.

More specifically, the modulation factor M and a value "0.78" that is a theoretical maximum value of the modulation factor M are input to a subtractor 17. The subtractor 17 subtracts "0.78" from the modulation factor M to derive a modulation factor deviation ΔM, as shown in a formula (6) below.

$$\Delta M = M - 0.78 \qquad (6)$$

The modulation factor deviation ΔM thus derived is input to the current adjustment command value deriving unit 16. The current adjustment command value deriving unit 16 integrates the modulation factor deviation ΔM by using a predetermined gain, and derives the integrated value as the d-axis current adjustment command value ΔId. The d-axis current adjustment command value ΔId is subtracted from the basic d-axis current command value Idb to derive the eventual d-axis current command value Id, as shown in the formula (1). That is, the d-axis current adjustment command value ΔId serves as a field-weakening command value for weakening the field flux of the electric motor MG.

Figure 3:
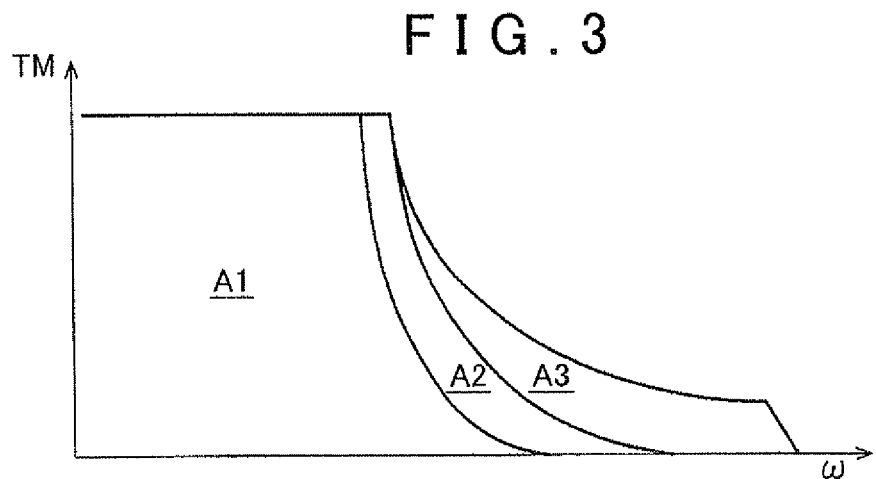
FIG. 3 is a diagram showing an example of a map referred to when determining a control mode.

The control device 2 according to the present embodiment is further provided with a mode determination unit 51 that determines the control mode for controlling the electric motor drive apparatus 1 and the carrier frequency setting unit 52 that determines the carrier frequency Fc of the inverter 6. At least the required torque TM and the rotational speed ω are input to the mode determination unit 51 as input variables. The mode determination unit 51 determines one control mode among a plurality of predefined control modes for controlling the electric motor drive apparatus 1, based on the required torque TM and the rotational speed ω thus input. The control device 2 has a map for determination of the control mode stored in the parameter memory 64 or the like. In the present embodiment, three areas of a first area A1, a second area A2, and a third area A3 are defined on the map as operable areas of the electric motor MG, as show in FIG. 3. Three control modes selectable by the mode determination unit 51 are defined corresponding to these areas. That is, the mode determination unit 51 selects a first control mode if the relation between the required torque TM and the rotational speed ω belongs to the first area A1, a second control mode if the relation belongs to the second area A2, or a third control mode if the relation belongs to the third area A3.

Regarding the control techniques involved in the control modes for controlling the electric motor drive apparatus 1, there are two techniques of the PWM control and rectangular-wave control with respect to the waveform of the alternating-current voltage supplied from the inverter 6 to the electric motor MG, and there are two techniques of the maximum torque control and the field-weakening control with respect to the phase of the alternating current supplied from the inverter 6 to the electric motor MG. Moreover, in the present embodiment, the PWM control includes two control methods of sine-wave PWM control and overmodulation PWM control. The three modes selectable by the mode determination unit 51 are structured by combining these techniques and methods.

The first control mode is a mode in which the inverter 6 performs the maximum torque control and the sine-wave PWM control when the inverter 6 converts the direct current to the alternating current. The sine-wave PWM control controls the on/off operation of the switching elements of the inverter 6 based on comparison of sinusoidal alternating-current voltage command values Vu, Vv, and Vw with the carrier (carrier wave) Ca. The sinusoidal alternating-current voltage command values Vu, Vv, and Vw are derived by a three-phase command value deriving unit 35 of a voltage control unit 23 to be described later.

The second control mode is a mode in which the inverter 6 performs the maximum torque control and the overmodulation PWM control when the inverter 6 converts the direct current to the alternating current. The overmodulation PWM control distorts the waveforms of the fundamental wave components of the output voltage waveforms of the inverter 6, and makes the amplitudes thereof larger than those of the sinusoidal alternating-current voltage command values Vu, Vv, and Vw in the sine-wave PWM control. In that state, the overmodulation PWM control controls the on/off operation of the switching elements of the inverter 6 based on comparison of the distorted sinusoidal alternating-current voltage command values Vu, Vv, and Vw with the carrier Ca, in the same manner as the sine-wave PWM control. Consequently, the PWM control is performed in which the alternating-current voltage command values Vu, Vv, and Vw are continuously at high levels or low levels in portions where the alternating-current voltage command values Vu, Vv, and Vw exceed the amplitude of the carrier wave. The distorted sinusoidal alternating-current voltage command values Vu, Vv, and Vw are derived by the three-phase command value deriving unit 35 of the voltage control unit 23 to be described later.

The third control mode is a mode in which the inverter 6 performs the field-weakening control and the rectangular-wave control when the inverter 6 converts the direct current to the alternating current. The rectangular-wave control controls the on/off operation of each of the switching elements of the inverter 6 so as to be performed once in one cycle (360° of magnetic pole position θ) of the electric angle. Then, each phase value of the alternating-current voltage command values Vu, Vv, and Vw is shaped into a rectangular waveform in which one high-level period and one low-level period alternately appear in one cycle. Accordingly, in the third control mode in the present embodiment, each phase value of the alternating-current voltage command values Vu, Vv, and Vw serves as a command value for an on/off switching phase that is a phase of the magnetic pole position θ simply representing the on/off switching timing of each of the switching elements of the inverter 6.

It should be noted that, in the third control mode in which the rectangular-wave control is performed, the synchronous control is performed in which the cycle of the electric angle of the electric motor MG detected as the magnetic pole position θ is synchronized with the switching cycle of the inverter 6. Here, the switching cycle is a cycle of the on/off timing of each of the switching elements of the inverter 6, and equal to a cycle of the on/off switching phase of each of the switching elements. On the other hand, in the first control mode in which the sine-wave PWM control is performed and the second control mode in which the overmodulation PWM control in performed, the switching control signals Pu, Nu, Pv, Nv, Pw, and Nw are generated based on the carrier Ca. That is, in the present embodiment, the third control mode is included in a "synchronous control mode", and the first control mode and the second control mode are included in an "asynchronous control mode". Note that in the present embodiment, the cycle of the alternating-current voltage command values Vu, Vv, and Vw is also not synchronized with the cycle of the carrier Ca of the switching control signals Pu, Nu, Pv, Nv, Pw, and Nw, in both of the first control mode and the second control mode. The mode determination unit 51 has a function to select either of the synchronous control mode and the asynchronous control mode such as described above. As will be described later, the control device 2 is structured such that control blocks in the voltage control unit 23 are switched by a voltage control switching unit 46 so as to switch the method for generating the alternating-current voltage command values Vu, Vv, and Vw and the switching control signals Pu, Nu, Pv, Nv, Pw, and Nw, depending on which of the synchronous control mode and the asynchronous control mode is selected by the mode determination unit 51.

In the present embodiment, the d-axis current adjustment command value ΔId derived by the current adjustment command value deriving unit 16 is also input to the mode determination unit 51. Then, the mode determination unit 51 determines whether or not the third control mode is to be selected, based on the d-axis current adjustment command value ΔId thus input. More specifically, the mode determination unit 51 permits to select the third control mode if the d-axis current adjustment command value ΔId is a predetermined threshold value for permission of shifting to third control mode or more, or, on the other hand, prohibits to select the third control mode if the d-axis current adjustment command value ΔId is less than the threshold value for permission of shifting to third control mode. Therefore, the mode determination unit 51 according to the present embodiment is structured so as to determine, as a prerequisite, the control mode based on the required torque TM and the rotational speed ω that are input, and set a certain limit to the control mode selection based on the d-axis current adjustment command value ΔId that is additionally input.

At least the rotational speed ω and the required torque TM are input to the carrier frequency setting unit 52 as input variables. The carrier frequency setting unit 52 determines the carrier frequency Fc that is the frequency of the carrier (carrier wave) Ca of the switching control signals Pu, Nu, Pv, Nv, Pw, and Nw for the inverter 6, based on the required torque TM and the rotational speed ω thus input. In other words, the carrier frequency Fc is a frequency of the carrier Ca for generating the switching control signals for the inverter 6 based on the pulse width modulation method. Note that in the present embodiment, the carrier frequency setting unit 52 is structured so as to be capable of individually setting each of carrier frequencies Fc1 and Fc2 for the first inverter 6a and the second inverter 6b, respectively, and the carrier Ca corresponding to the first inverter 6a is referred to as a first carrier Ca1 whereas the carrier Ca corresponding to the second inverter 6b is referred to as a second carrier Ca2. However, in the present description, the first carrier Ca1 and the second carrier Ca2 are simply denoted as the carrier Ca when need not be particularly distinguished. Note that the carrier frequency setting unit 52 can be structured to receive as an input the modulation factor M derived by the modulation factor and voltage command phase deriving unit 22. That is, the carrier frequency setting unit 52 can be structured so as to determine the carrier frequency Fc based on the rotational speed ω and the modulation factor M input to the carrier frequency setting unit 52 either instead of, or together with, the required torque TM.

In the present embodiment, the control device 2 has a map for determination of the carrier frequency stored in the parameter memory 64 or the like. The carrier frequency setting unit 52 determines an optimal value of the carrier frequency Fc for reducing a loss in the inverter 6 and a loss in the electric motor MG depending on the required torque TM and the rotational speed ω of the electric motor MG, and so on. In this case, the carrier frequency setting unit 52 determines the optimal carrier frequency Fc, for example, by selecting the optimal carrier frequency Fc from a plurality of predetermined selectable carrier frequencies based on the map. Then, if the setting of the carrier frequency Fc needs to be switched, the carrier frequency setting unit 52 switches the setting of the carrier frequency Fc based on the switching timing obtained from the switching timing table 100 to be described later. In the present embodiment, as will be described later, the switching timing is specified based on a relation between a phase in the cycle of the current detection processing for each of the two electric motors MG and a phase of the carrier that is set for the inverter 6 corresponding to each of the electric motors MG. Therefore, the carrier frequency setting unit 52 receives information on those phases from a carrier generator (not shown) for generating the carrier Ca and a current detection management unit (not shown) serving as a functional unit for managing an execution schedule (control schedule) of the current detection processing, and determines the switching timing on a real time basis. Note that the switching timing table 100 is provided by being stored in the parameter memory 64 or the like.

The modulation factor M and the voltage command phase $\theta v$ derived by the modulation factor and voltage command phase deriving unit 22 are input to the voltage control unit 23. The magnetic pole position $\theta$ detected by the rotation sensor 8 (refer to FIG. 1) and the carrier frequency Fc determined by the carrier frequency setting unit 52 are also input to the voltage control unit 23. Based on the modulation factor M, the voltage command phase $\theta v$, the magnetic pole position $\theta$, and the carrier frequency Fc thus input, the voltage control unit 23 performs the voltage control processing that determines the alternating-current voltage command values Vu, Vv, and Vw, and generates the switching control signals Pu, Nu, Pv, Nv, Pw, and Nw for the inverter 6. In the present embodiment, the voltage control unit 23 is provided with the three-phase command value deriving unit 35 and an asynchronous control signal generating unit 41, as well as an on/off switching phase deriving unit 43 and a synchronous control signal generating unit 42.

In addition, the voltage control switching unit 46 is provided between the modulation factor and voltage command phase deriving unit 22 and the voltage control unit 23. The voltage control switching unit 46 switches the control blocks in the voltage control unit 23 depending on the control mode selected by the mode determination unit 51. Specifically, if the first control mode or the second control mode included in the asynchronous control mode is selected, the modulation factor M and the voltage command phase $\theta v$ derived by the modulation factor and voltage command phase deriving unit 22 are input to the three-phase command value deriving unit 35 to cause the three-phase command value deriving unit 35 and the asynchronous control signal generating unit 41 to perform the voltage control processing. On the other hand, if the third control mode included in the synchronous control mode is selected, the modulation factor M and the voltage command phase $\theta v$ derived by the modulation factor and voltage command phase deriving unit 22 are input to the on/off switching phase deriving unit 43 to cause the on/off switching phase deriving unit 43 and the synchronous control signal generating unit 42 to perform the voltage control processing. The voltage control switching unit 46 switches the input destination of the modulation factor M and the voltage command phase $\theta v$ as described above, depending on the control mode selected by the mode determination unit 51. Consequently, the voltage control unit 23 generates the switching control signals Pu, Nu, Pv, Nv, Pw, and Nw depending on the control mode selected by the mode determination unit 51.

Figure 4:
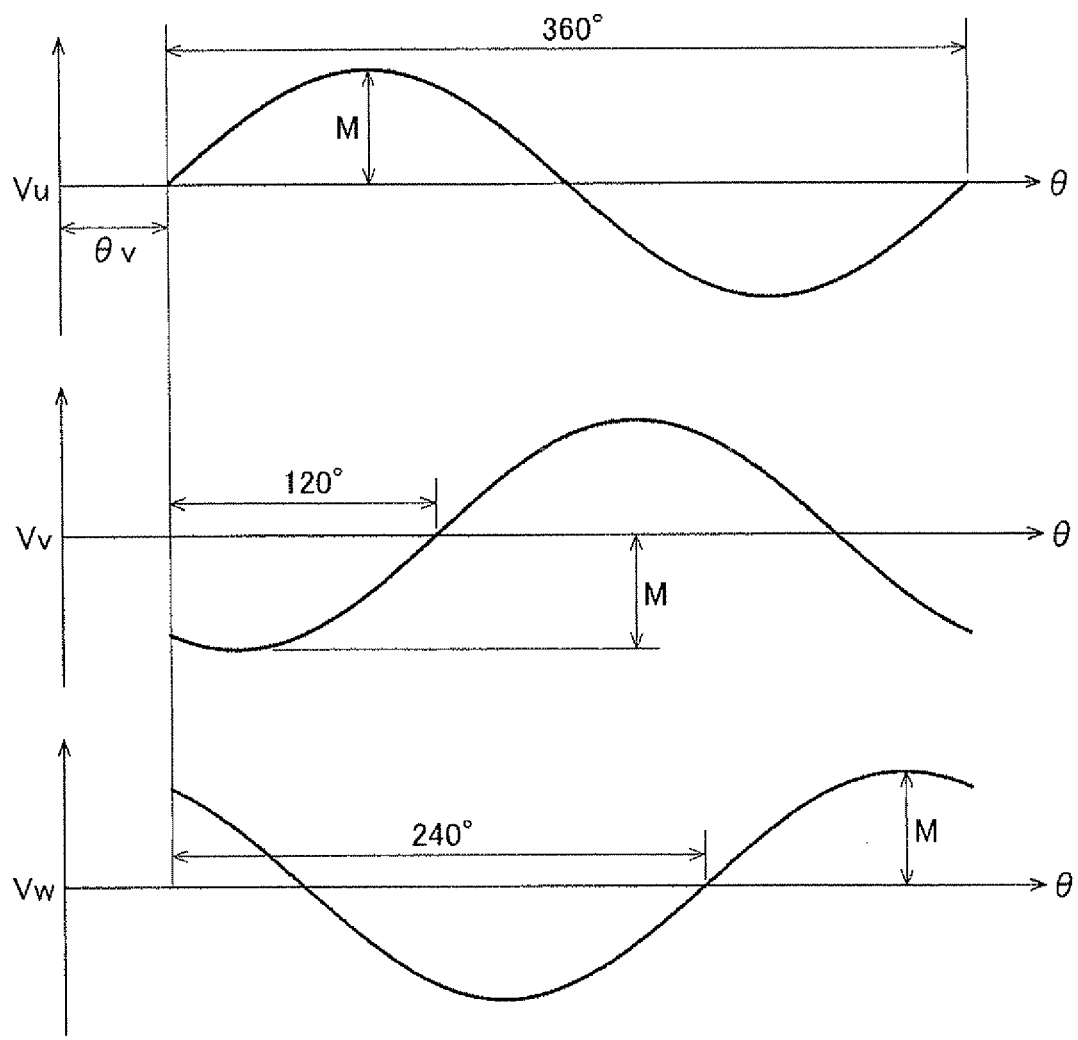
FIG. 4 is a diagram showing an example of alternating-current voltage command values in a first control mode.

The three-phase command value deriving unit 35 generates the sinusoidal alternating-current voltage command values Vu, Vv, and Vw based on the modulation factor M and the voltage command phase $\theta v$ input. FIG. 4 is a diagram showing an example of the alternating-current voltage command values Vu, Vv, and Vw generated by the three-phase command value deriving unit 35. This diagram shows the example in which the alternating-current voltage command values Vu, Vv, and Vw are the voltage command values in the first control mode. In this case, the u-phase voltage command value Vu is the sinusoidal voltage command value that has a phase behind the origin ($\theta=0°$) of the magnetic pole position $\theta$ by the voltage command phase $\theta v$, an amplitude equal to the modulation factor M, and a cycle equal to one turn of the magnetic pole position $\theta$ (electric angle of one turn, 360°). The v-phase voltage command value Vv and the w-phase voltage command value Vw are the sinusoidal voltage command values that have phases behind the phase of the u-phase voltage command value Vu by 120° and by 240°, respectively. If the second control mode is selected, the alternating-current voltage command values Vu, Vv, and Vw have distorted sinusoidal waveforms. However, the phases and the amplitudes of the command values are the same as those in FIG. 4.

Here, the three-phase command value deriving unit 35 is provided with an alternating-current voltage command value map specifying a waveform of the alternating-current voltage command values Vu, Vv, and Vw for each of the control modes, and generates and outputs the alternating-current voltage command values Vu, Vv, and Vw based on the alternating-current voltage command value map depending on the control mode determined by the mode determination unit 51. For example, in the case of the alternating-current voltage command value map for the first control mode, the map specifies a sinusoidal voltage waveform with the origin thereof coinciding with the origin ($\theta=0°$) of the magnetic pole position $\theta$ and the amplitude thereof equal to one. The three-phase command value deriving unit 35 can generate the u-phase voltage command value Vu by delaying the origin of the voltage waveform specified in the map by the voltage command phase $\theta v$, and multiplying the amplitude thereof by the modulation factor M, and generate the v-phase voltage command value Vv and the w-phase voltage command value Vw by delaying the phase of the u-phase voltage command value Vu by 120°, and 240°, respectively. The three-phase command value deriving unit 35 is provided with a map of a different voltage waveform for each of the control modes.

The alternating-current voltage command values Vu, Vv, and Vw generated by the three-phase command value deriving unit 35 and the carrier frequency Fc are input to the asynchronous control signal generating unit 41. The asynchronous control signal generating unit 41 generates the switching control signals Pu, Nu, Pv, Nv, Pw, and Nw for the inverter 6 based on the alternating-current voltage command values Vu, Vv, and Vw and on the carrier (carrier wave) Ca. Specifically, the asynchronous control signal generating unit 41 compares the alternating-current voltage command values Vu, Vv, and Vw with the carrier Ca, and generates the six switching control signals Pu, Nu, Pv, Nv, Pw, and Nw for PWM-controlling the switching elements on the upper side of the u-phase, the lower side of the u-phase, the upper side of the v-phase, the lower side of the v-phase, the upper side of the w-phase, and the lower side of the w-phase of the inverter 6. Accordingly, the asynchronous control signal generating unit 41 outputs the switching control signal to each of the switching elements basically twice in each carrier cycle. The on/off pulse width represented by the switching control signal changes in a stepwise manner for each carrier cycle, depending on the level of each of the substantially sinusoidal alternating-current voltage command values Vu, Vv, and Vw that change continuously with the carrier Ca. In the present embodiment, the carrier frequency Fc is not an integral multiple of a frequency of the alternating-current voltage command values Vu, Vv, and Vw. Therefore, the cycle of the carrier Ca is not synchronized with the cycle of the alternating-current voltage command values Vu, Vv, and Vw. However, the PWM control can be performed in the state in which the cycle of the carrier Ca is synchronized with the cycle of the alternating-current voltage command values Vu, Vv, and Vw.

Figure 5:
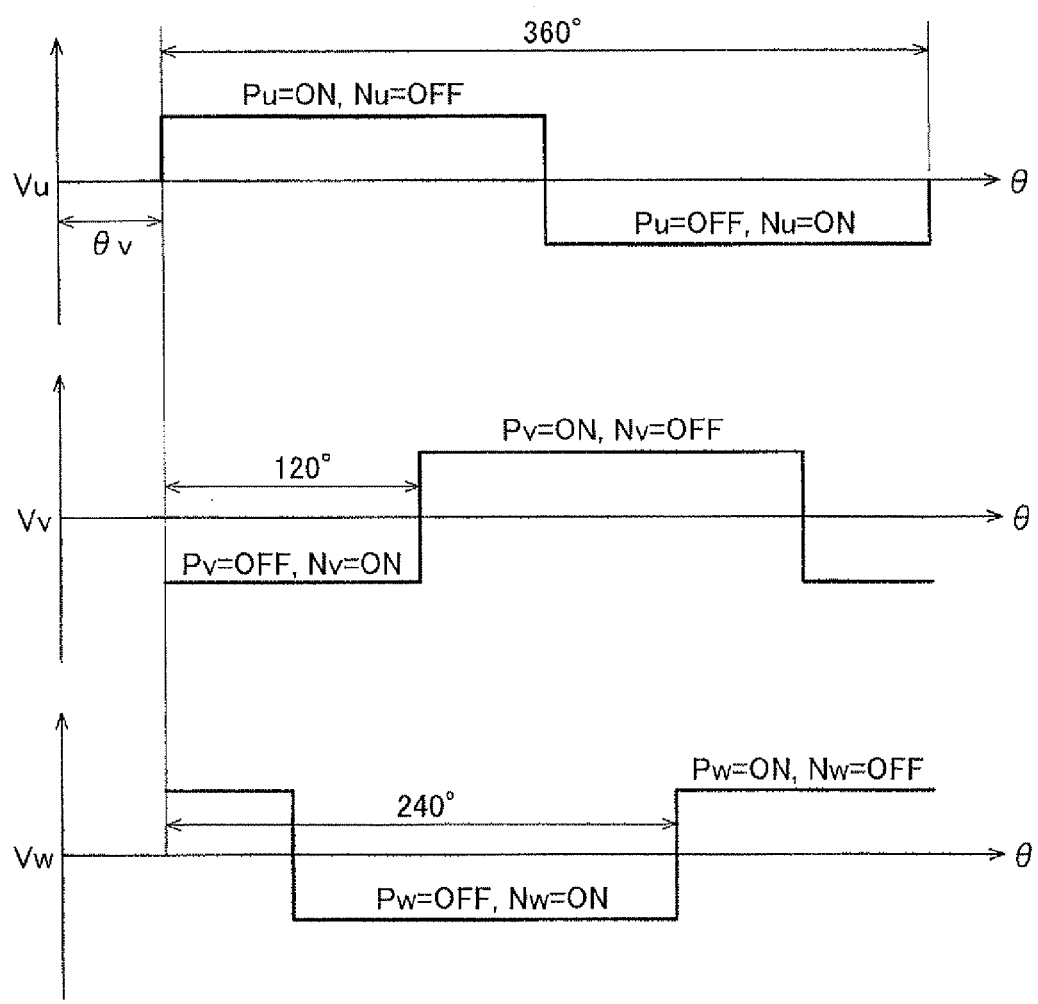
FIG. 5 is a diagram showing an example of alternating-current voltage command values in a third control mode.

The on/off switching phase deriving unit 43 generates command values for the on/off switching phases of the switching elements of the inverter 6 as the alternating-current voltage command values Vu, Vv, and Vw, based on the modulation factor M and the voltage command phase θv input. Each of these command values corresponds to the on/off control signal for each of the switching elements, being a command value indicating the phase of the magnetic pole position θ representing the timing for on/off switching of each on the switching elements. FIG. 5 graphically illustrates the data represented by the alternating-current voltage command values Vu, Vv, and Vw generated by the on/off switching phase deriving unit 43, showing the phases at which each of the switching elements is switched on or off, on the horizontal axis for the magnetic pole position θ. In this example, the u-phase voltage command value Vu has a phase behind the origin (θ=0°) of the magnetic pole position θ by the voltage command phase θv, and one turn of the magnetic pole position θ (electric angle of one turn, 360°) corresponds to one cycle. At the voltage command phase θv, the switching control signal Pu corresponding to the switching element on the upper side of the u-phase is switched on, and the switching control signal Nu corresponding to the switching element on the lower side of the u-phase is switched off. At the point of a half turn of the magnetic pole position θ (electric angle of a half turn, 180°) from the voltage command phase θv, the switching control signal Pu corresponding to the switching element on the upper side of the u-phase is switched off, and the switching control signal Nu corresponding to the switching element on the lower side of the u-phase is switched on. The v-phase voltage command value Vv and the w-phase voltage command value Vw are the same command values as the u-phase voltage command value Vu except that the command values Vv and Vw have the phases behind the phase of the command value Vu by 120° and by 240°, respectively. It should be noted that the alternating-current voltage command values Vu, Vv, and Vw actually output from the on/off switching phase deriving unit 43 can be composed only of information on the phases of the magnetic pole position θ serving as information for indicating the on/off switching timings of the switching elements corresponding to the u-phase, the v-phase, and the w-phase. Accordingly, the command values for the on/off switching phases as described above may be output collectively as a series of information on the u-phase, v-phase, and w-phase command values.

Here, the on/off switching phase deriving unit 43 is provided with an on/off switching phase map specifying the on/off switching phase of the switching elements constituting the alternating-current voltage command values Vu, Vv, and Vw for each of the control modes, and generates and outputs the alternating-current voltage command values Vu, Vv, and Vw based on the on/off switching phase map. The on/off switching phase map specifies, for example, the phase that has an origin coinciding with the origin (θ=0°) of the magnetic pole position θ, and a point at which the state is switched between the state of the upper side switching element being on and the lower side switching element being off, and the state of the upper side switching element being off and the lower side switching element being on, for each of the u-phase, the v-phase, and the w-phase. The on/off switching phase deriving unit 43 can generate the u-phase voltage command value Vu by delaying the origin of the on/off phase specified in the map by the voltage command phase θv, and generate the v-phase voltage command value Vv and the w-phase voltage command value Vw by delaying the phase of the u-phase voltage command value Vu by 120°, and by 240°, respectively.

The alternating-current voltage command values Vu, Vv, and Vw generated by the on/off switching phase deriving unit 43 are input to the synchronous control signal generating unit 42. The synchronous control signal generating unit 42 generates the switching control signals Pu, Nu, Pv, Nv, Pw, and Nw for the inverter 6 based on the alternating-current voltage command values Vu, Vv, and Vw. Specifically, the synchronous control signal generating unit 42 generates the six switching control signals Pu, Nu, Pv, Nv, Pw, and Nw for controlling the on/off states of the switching elements on the upper side of the u-phase, the lower side of the u-phase, the upper side of the v-phase, the lower side of the v-phase, the upper side of the w-phase, and the lower side of the w-phase of the inverter 6, according to the command values for the on/off switching phases of the switching elements of the inverter 6. The on/off pulse width represented by the switching control signal takes a value predetermined according to the on/off switching phases. At the same time, the voltage control unit 23 including the synchronous control signal generating unit 42 is performing the voltage control processing in a predetermined calculation cycle, and the switching control signals Pu, Nu, Pv, Nv, Pw, and Nw are output in the predetermined calculation cycle, thus changing the timing for on/off switching of each the switching elements. Accordingly, the timing for on/off switching of each the switching elements is changed in the predetermined calculation cycle, whereas the switching elements of the inverter 6 are controlled in synchronization with the electric angle (magnetic pole position θ) of the electric motor MG. Consequently, the cycle of the electric angle of the electric motor MG and the switching cycle (cycle of on/off timing of switching element) of the inverter 6 are synchronized with each other.

3. Structure of Switching Timing Table

Next, description will be made of a structure of the switching timing table 100 (refer to FIG. 2) as an essential part of the present invention, based on FIGS. 6 to 11E. In the present embodiment, as described above, the control device 2 is structured so as to control the two inverters 6 (first inverter 6a and second inverter 6b) respectively provided corresponding to the two electric motors MG1 and MG2. The carrier frequency setting unit 52 obtains an appropriate value of the carrier frequency Fc for each of the two inverters 6a and 6b based on the map for determination of the carrier frequency. Then, if at least one of the settings of the carrier frequencies Fc for the two inverters 6a and 6b needs to be switched, the carrier frequency setting unit 52 switches the setting of the carrier frequency Fc, and at this time, the carrier frequency setting unit 52 refers to the switching timing table 100 so as to obtain the switching timing.

The switching timing table 100 is a table that specifies a switching timing serving as a permissible timing of switching to a different carrier frequency pair from each of a plurality of carrier frequency pairs each of which is composed of a combination of the carrier frequencies Fc set for each of the plurality (two in the example of the present embodiment) of inverters 6. The switching timing specified by the switching timing table 100 is a timing at which the current detection processing for each of the two electric motors MG is performed in accordance with a maximum value or a minimum value of the carrier Ca set for the inverter 6 corresponding to each of the electric motors MG, after the switching of the carrier frequency pair. Consequently, the current surge at the switching of the carrier frequency Fc and the current ripple after the switching of the carrier frequency Fc can be suppressed from occurring. Note that the expression "(Fc1, Fc2)" in the following description means a carrier frequency pair composed of a combination of the carrier frequency Fc1 set for the first inverter 6a (first electric motor MG1) and the carrier frequency Fc2 set for the second inverter 6b (second electric motor MG2).

In the present embodiment, the carrier frequency setting unit 52 is structured so as to individually set a carrier frequency selected from five carrier frequencies, 1.25 kHz, 2.5 kHz, 5 kHz, 7.5 kHz, and 10 kHz, for each of the two inverters 6a and 6b. Therefore, in the example of the present embodiment, as shown in FIG. 6, there are 25 carrier frequency pairs (Fc1, Fc2). As a result, the switching timing table 100 specifies the switching timing serving as a permissible timing of switching to a different carrier frequency pair from each of the 25 carrier frequency pairs.

In addition, by assuming the frequency of 5 kHz as the standard carrier frequency for both of the first inverter 6a and the second inverter 6b, the switching timing table 100 is provided for both a timing of switching from the standard carrier frequency to another carrier frequency and a timing of switching from the carrier frequency other than the standard carrier frequency to the standard carrier frequency. Moreover, the carrier frequency setting unit 52 is structured so as to perform frequency switching through the standard carrier frequency when switching between carrier frequencies other than the standard carrier frequency. Furthermore, in the present embodiment, the switching timing is structured so as not to switch the carrier frequency Fc1 and the carrier frequency Fc2 at the same time.

Therefore, the switching timing table 100 specifies switching timings for switching of the carrier frequency pair in a manner moving in the vertical direction or the horizontal direction in FIG. 6. Specifically, for the switching of the carrier frequency pair in a manner moving in the vertical direction, the switching timing is specified with respect to the case in which the carrier frequency Fc1 for the first inverter 6a before or after switching is 5 kHz, which is the standard carrier frequency, whereas for the switching of the carrier frequency pair in a manner moving in the horizontal direction, the switching timing is specified with respect to the case in which the carrier frequency Fc2 for the second inverter 6b before or after switching is 5 kHz, which is the standard carrier frequency. No switching timing is specified for switching of the carrier frequency pair in a manner moving in an oblique direction in FIG. 6. Moreover, even in the case of switching of the carrier frequency pair in a manner moving in the vertical or horizontal direction in FIG. 6, no switching timing is specified with respect to the case in which neither of the carrier frequencies Fc1 and Fc2 before or after switching is 5 kHz. Note that, in FIG. 6, only the switching operations of the carrier frequency pairs corresponding to switching timings to be described later as specific examples are indicated by arrows pointing from carrier frequency pairs before switching to carrier frequency pairs after switching.

By structuring the switching timing table 100 as described above, it is sufficient to specify the switching timings between the standard carrier frequency (5 kHz in the example of the present embodiment) and other carrier frequencies, and it is unnecessary to specify any switching timing between carrier frequencies other than the standard carrier frequency. Consequently, the number of the switching timings specified by the switching timing table 100 for the carrier frequency pairs can be limited to a small value. Note that it is preferable to make the most frequently selected carrier frequency serve as the standard carrier frequency.

FIGS. 7A to 11E are diagrams conceptually showing the switching timing table 100. As described above, there are 25 carrier frequency pairs in the example of the present embodiment. Here, the carrier frequencies having the same value of the carrier frequency Fc2 in common are collected in one set of drawings so as to show the 25 carrier frequency pairs in five sets of the drawings. Each graph shown in these diagrams has a horizontal axis serving as a time axis, and illustrates the waveforms of the carriers Ca (first carrier Ca1 and second carrier Ca2) respectively corresponding to the carrier frequencies Fc1 and Fc2 set for the inverters 6a and 6b, the execution schedule (control schedule) of the current control processing and the voltage control processing, and the switching timings of the carrier frequency Fc.

In these diagrams, the waveform of the carrier Ca shown on the upper side is the waveform of the first carrier Ca1 corresponding to the carrier frequency Fc1 set for the first inverter 6a (first electric motor MG1), whereas the waveform shown on the lower side is the waveform of the second carrier Ca2 corresponding to the carrier frequency Fc2 set for the second inverter 6b (second electric motor MG2). Note that, in the example of the present embodiment, the carrier Ca is a triangular wave, and the maximum value and the minimum value of the waveform of the carrier Ca are called "peak" and "valley", respectively. Note also that one scale on the horizontal axis corresponds to the standard calculation cycle T0, and vertically extending dashed lines representing the scale marks on the time axis correspond to start points of the successive standard calculation cycles T0.

Here, the standard calculation cycle T0 is a control cycle serving as a standard to be measured by the timer 66 (refer to FIG. 1) of the CPU 61, and an interrupt function of the CPU 61 is executed in every standard calculation cycle T0. That is, the interrupt function of the CPU 61 is executed at points of the scale marks on the time axis in FIGS. 7A to 11E. Note that, in the present embodiment, the standard calculation cycle T0 is set, as an example, to 100 [μs], which is a half value of the cycle of the carrier Ca corresponding to the standard carrier frequency (5 kHz in the example of the present embodiment).

FIGS. 7A to 11E also conceptually show the execution schedule of the current control processing and the voltage control processing for the first inverter 6a (first electric motor MG1) and the second inverter 6b (second electric motor MG2) in accordance with the waveforms of the carriers Ca. Note that the diagrams in FIGS. 7A to 11E do not show exact timings of the current control processing and the voltage control processing, but show that those processing operations are performed in the standard calculation cycle T0 where rectangular marks representing those processing operations are located.

In addition, those diagrams indicate the switching timings with thick solid lines. The text enclosed in a box corresponding to the thick solid line represents which of the carrier frequencies Fc1 and Fc2 for the first inverter 6a (first electric motor MG1) and the second inverter 6b (second electric motor MG2) corresponds to the indicated switching timing, and a numerical value of the carrier frequency Fc1 or Fc2 after switching. That is, the text "MG1" represents that the switching timing is that of the carrier frequency Fc1 for the first inverter 6a corresponding to the electric motor MG1, whereas the text "MG2" represents that the switching timing is that of the carrier frequency Fc2 for the second inverter 6b corresponding to the electric motor MG2. In addition, the numerical value following the text "MG1" or "MG2" represents the carrier frequency after switching corresponding to the switching timing.

Note that in each of the diagrams showing the carrier frequency pair, if there are a plurality of identical switching timings in the time range shown in the diagram, only one of the timings is indicated with the thick solid line. Although details will be described later, in the present embodiment, because the switching timing is specified based on the relation between the phase in the execution cycle of the current detection processing and the phase of the carrier Ca, there may be different switching timings with identical carrier frequencies after switching, as shown in FIG. 7E. In such a case, the switching timings are shown without omission even if the carrier frequencies after switching are identical.

Because the carrier frequency Fc is individually set for each of the inverters 6a and 6b, a relation of phase on the time axis between carrier frequencies composing one carrier frequency pair is not uniquely determined for the carrier frequency pair. However, in the present embodiment, the relation of phase on the time axis between the carrier frequencies composing the carrier frequency pair is set to a predetermined relation in advance for each of the carrier frequency pairs, and the switching timing table 100 specifies the switching timing between the carrier frequency pairs, for each of which the relation of phase on the time axis between the carrier frequencies is set to the predetermined relation in advance. In other words, the switching timing table 100 specifies the switching timing so that the relation of phase on the time axis between the carrier frequencies in each of the plurality of carrier frequency pairs coincides with the predetermined relation set for each of the carrier frequency pairs. Consequently, it is not necessary to consider a different phase relation between the carrier frequencies on the time axis with respect to the same carrier frequency pair, and therefore, the number of the switching timings specified by the switching timing table 100 for the carrier frequency pairs can be limited to a small value.

Note that the expression "relation of phase on the time axis between carrier frequencies" means a positional relation on the time axis between start points of cycles of waveforms (for example, valleys of carrier waveforms) of the corresponding carriers Ca. Particularly, if the plurality of carrier frequencies Fc to be compared are identical frequencies, the expression also means a relation with respect to a phase difference (for example, in-phase, anti-phase, or 90 degrees out of phase). That is, the expression "relation of phase on the time axis between carrier frequencies" means a relative positional relation in the forward/backward direction on the time axis (left/right direction in the diagram) between the first carrier Ca1 corresponding to the carrier frequency Fc1 and the second carrier Ca2 corresponding to the carrier frequency Fc2, on the graphs of FIGS. 7A to 11E.

Figure 9A:
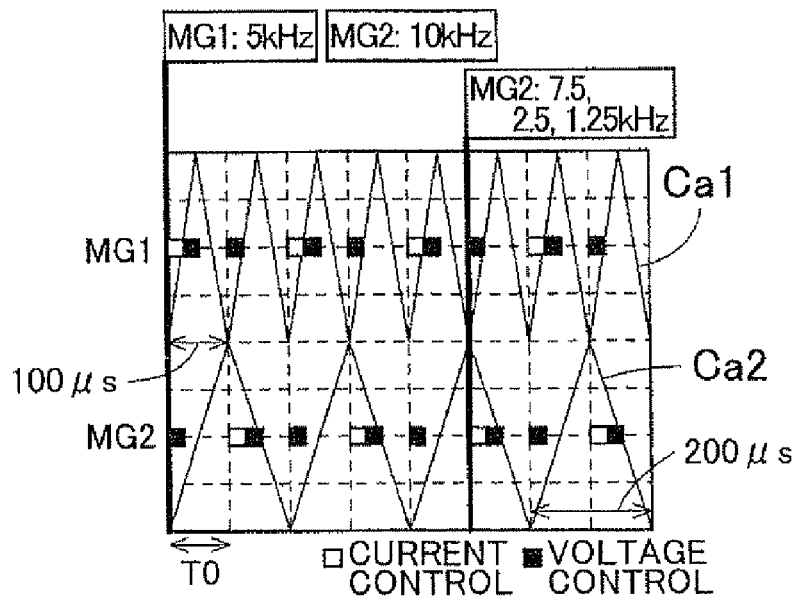
FIGS. 9A to 9E are diagrams conceptually showing the switching timing table according to the embodiment of the present invention.
Figure 9B:
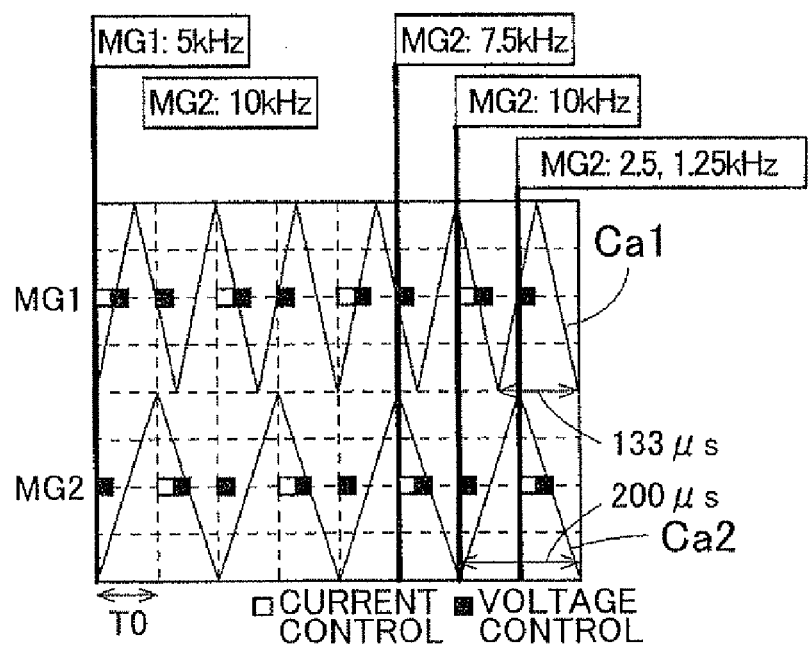
Figure 9C:
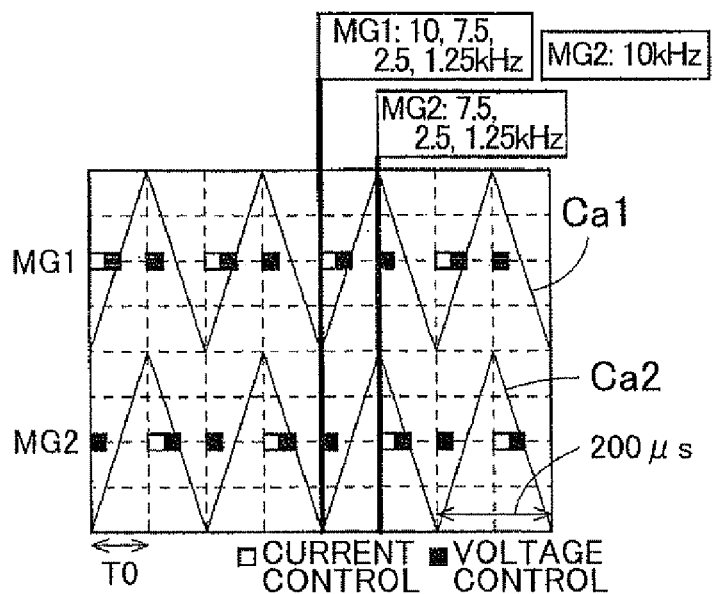
Figure 9D:
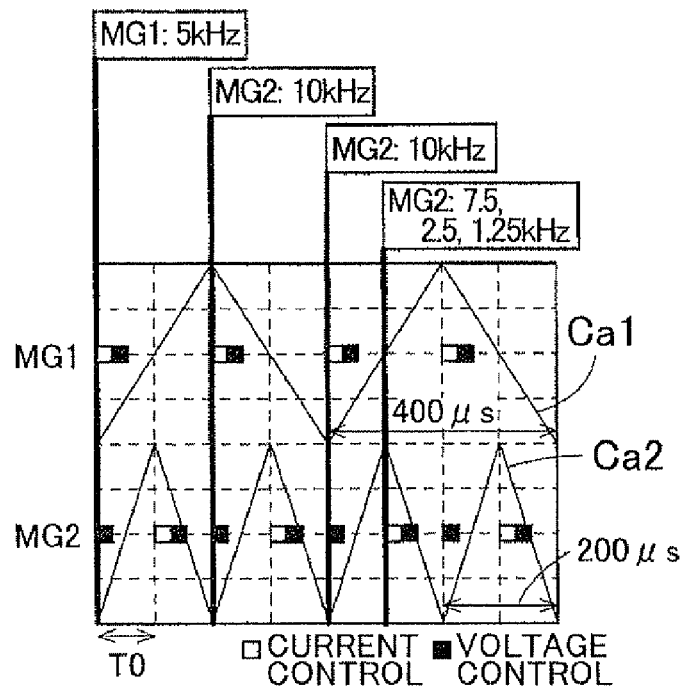

For example, for a carrier frequency pair (5 kHz, 5 kHz) in the example of the present embodiment, two relations of phase on the time axis between carrier frequencies are set so that the carriers Ca1 and Ca2 are in-phase with each other, as shown in FIG. 9C. For a carrier frequency pair (7.5 kHz, 5 kHz) in the example of the present embodiment, a relation of phase on the time axis between two carrier frequencies is set so that a timing at which a peak of the first carrier Ca1 overlaps a valley of the second carrier Ca2 and a timing at which a valley of the first carrier Ca1 overlaps a peak of the second carrier Ca2 alternately appear in a cycle of twice longer than the standard calculation cycle T0, as shown in FIG. 9B.

The execution schedule for each of the carrier frequency pairs that defines the timings for performing the current control processing and the voltage control processing is also set in advance for each of the carrier frequencies Fc in each of the carrier frequency pairs, as shown in FIGS. 7A to 11E. In addition, in the present embodiment, the current detection processing to detect the currents flowing in the coils of the electric motor MG is structured so as to be performed in accordance with the start point of the standard calculation cycle T0 during which the current control processing is performed for the corresponding inverter 6. That is, the current detection processing is performed at the time at which the left side of an outlined white rectangle representing the current control processing is located in the diagram. In other words, the current control processing for the inverters 6a and 6b is structured so as to be performed in the standard calculation cycle T0 immediately after the current detection processing for the electric motors MG1 and MG2 corresponding to the inverters 6a and 6b. Consequently, the current detection values detected by the current detection processing can be reflected quickly in the current control processing.

In order to suppress the current detection values from including noise caused by switching noise, the current detection processing is desirable to be performed in accordance with the peak or the valley of the carrier Ca. The reason for that is that switching of the switching control signal between a high level and a low level is not performed at the peak and the valley of the carrier Ca. From such a point of view, in the present embodiment, as shown in FIGS. 7A to 11E, the execution schedule of the current control processing is set so as to perform the current control processing for each of the carrier frequencies of all of the carrier frequency pairs in the standard calculation cycle T0 starting at the peak or the valley of the corresponding carrier Ca. Consequently, the current detection processing is performed in accordance with the peak or the valley of the carrier Ca. Accordingly, the current feedback control that is performed based on the current values detected in the current detection processing can be stabilized, and the current surge at the switching of the carrier frequency Fc and the current ripple after the switching of the carrier frequency Fc are suppressed from occurring.

Because the current control processing involves a relatively large calculation load, it is preferable to have a structure in which the current control processing for the first inverter 6a and the current control processing for the second inverter 6b are not performed in the same standard calculation cycle T0. From such a point of view, in the present embodiment, as shown in FIGS. 7A to 11E, the execution schedule of the current control processing is arranged for all of the carrier frequency pairs so that the current control processing for the first inverter 6a and the current control processing for the second inverter 6b are performed in the different standard calculation cycles T0. Consequently, the current detection processing for the first electric motor MG1 and the current detection processing for the second electric motor MG2 are also not performed at the same timing.

Specifically, the current detection processing is structured so as to be cyclically performed for the two electric motors MG at times synchronized with the standard calculation cycle T0 and mutually different from each other. For example, as shown in FIG. 9C, for the carrier frequency pair (5 kHz, 5 kHz), the current detection processing for the first electric motor MG1 is performed in accordance with the valley of the first carrier Ca1 in a cycle of twice longer than the standard calculation cycle T0. The current detection processing for the second electric motor MG2 is performed in accordance with the peak of the second carrier Ca2 in a cycle of twice longer than the standard calculation cycle T0. The start point of the cycle of the current detection processing for the first electric motor MG1 and the start point of the cycle of the current detection processing for the second electric motor MG2 are structured so as to be relatively shifted from each other by the standard calculation cycle T0 so that the current detection processing for the first electric motor MG1 and the current detection processing for the second electric motor MG2 are performed at mutually different times. Thus, the current detection processing for the first electric motor MG1 and the current detection processing for the second electric motor MG2 are alternately performed in every standard calculation cycle T0.

Figure 9E:
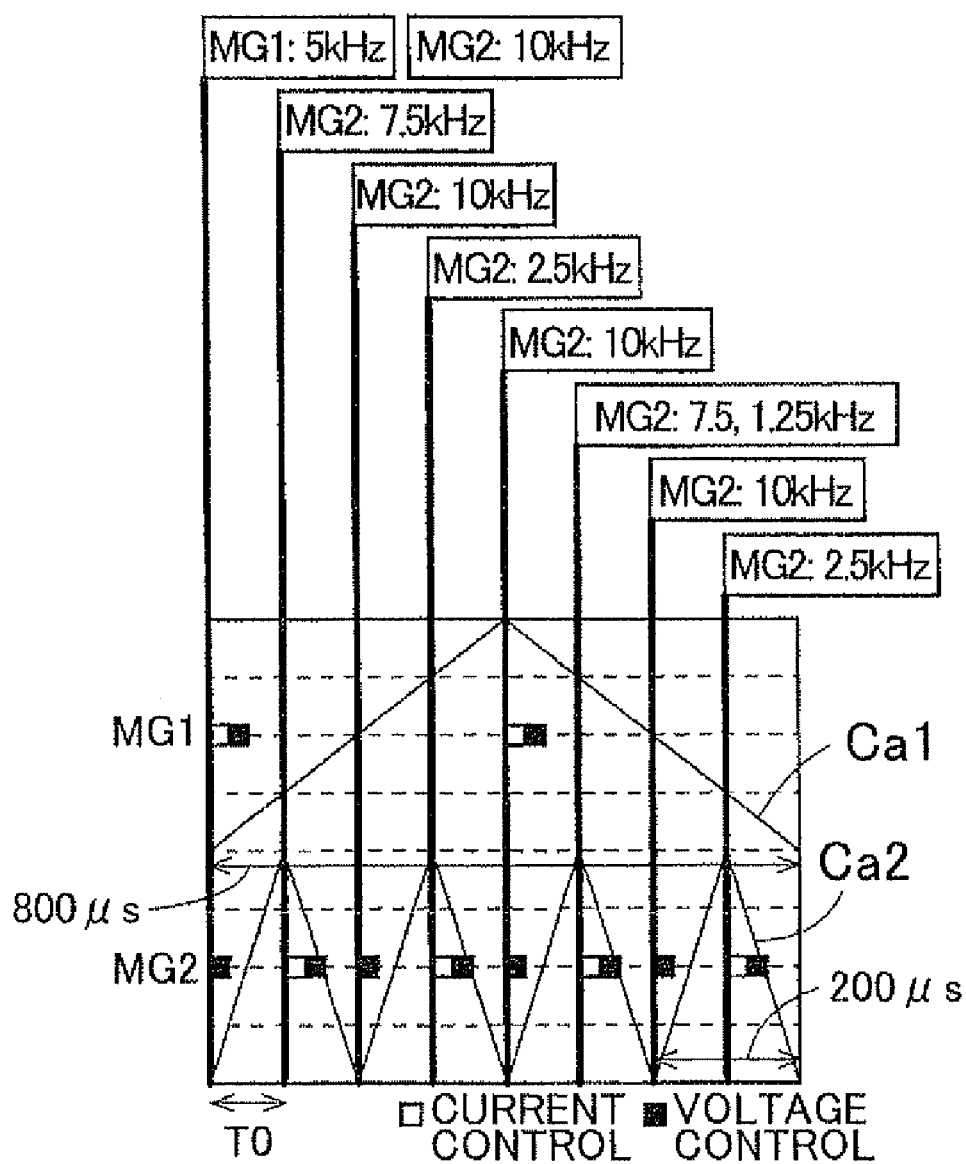
Figure 10A:
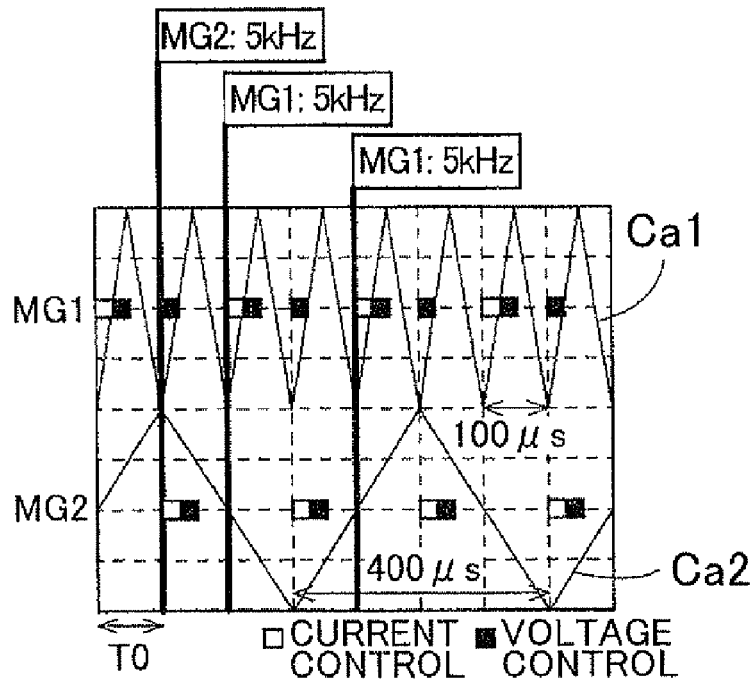
FIGS. 10A to 10E are diagrams conceptually showing the switching timing table according to the embodiment of the present invention.
Figure 10B:
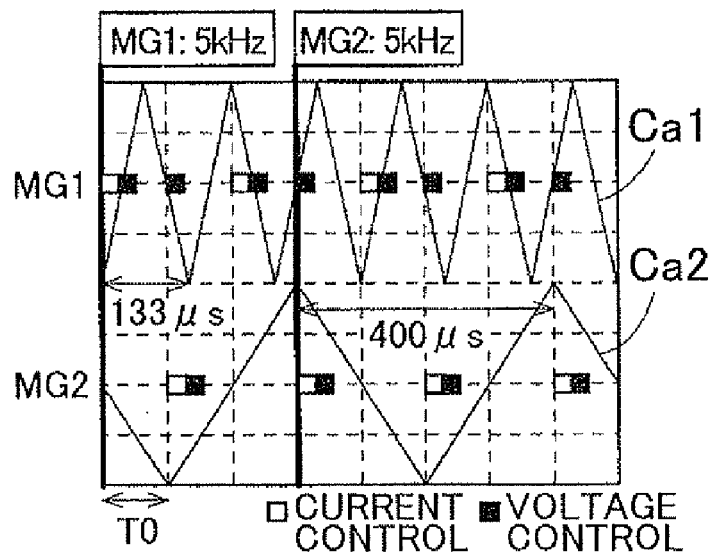
Figure 10C:
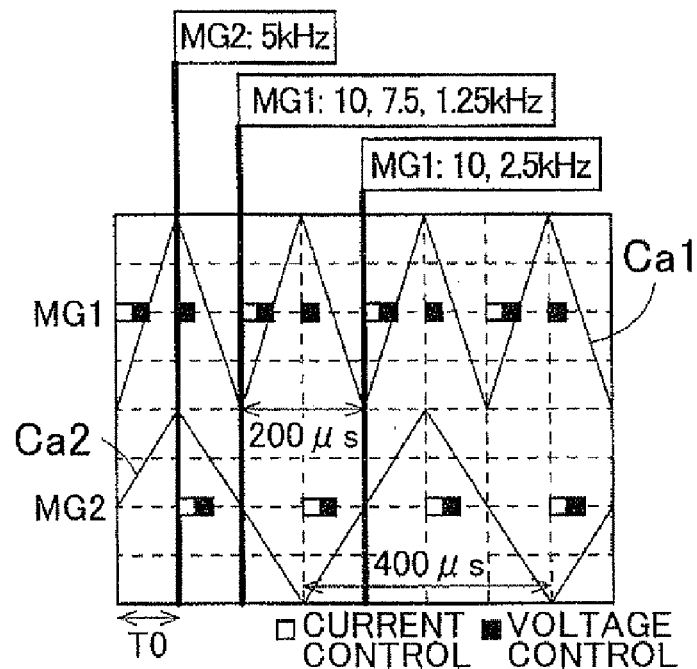
Figure 10D:
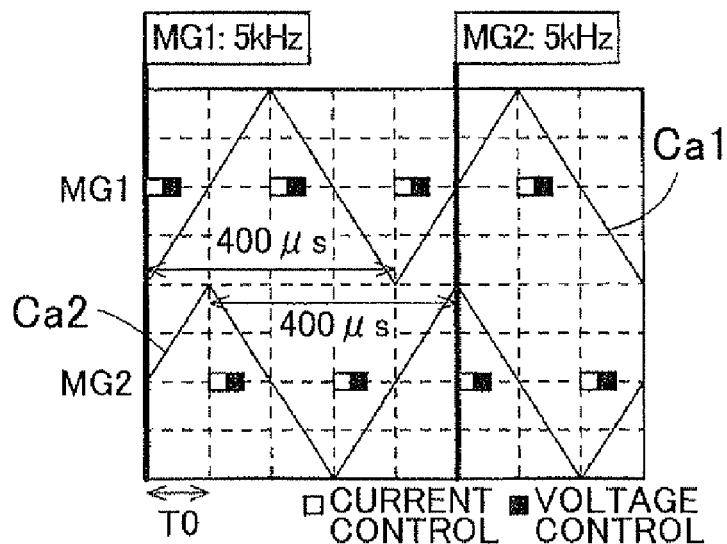
Figure 10E:
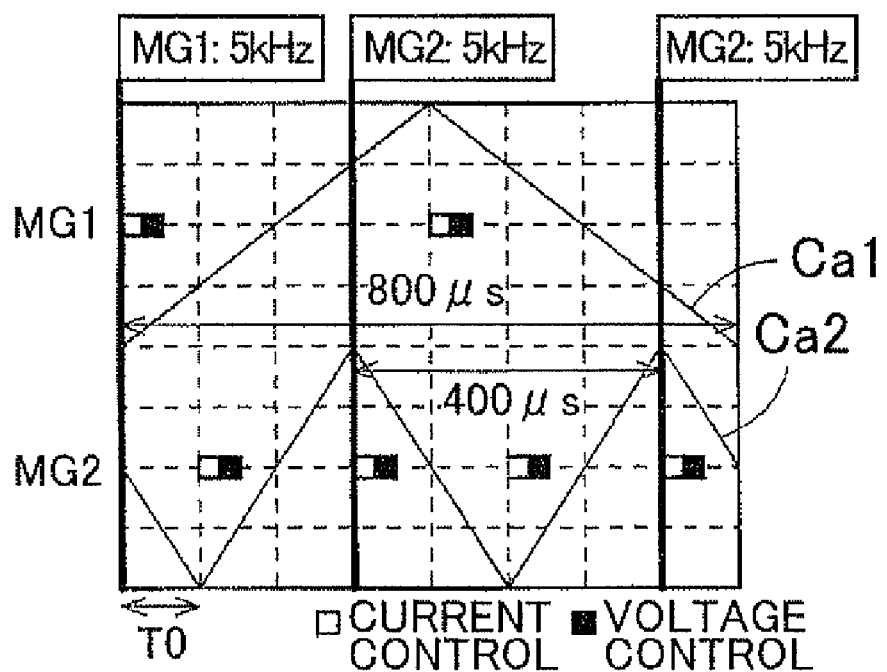

As shown in FIG. 9E, for a carrier frequency pair (1.25 kHz, 5 kHz), the current detection processing for the first electric motor MG1 is performed in a cycle of four times longer than the standard calculation cycle T0, and the current detection processing for the second electric motor MG2 is performed in a cycle of twice longer than the standard calculation cycle T0. Also in this case, the execution schedule of the current control processing is set so as not to perform the current detection processing for the first electric motor MG1 and the current detection processing for the second electric motor MG2 at the same timing.

On the other hand, as shown in FIGS. 7A to 11E, depending on the value of the carrier frequency Fc, there is a case in which the voltage control processing is performed only in the standard calculation cycle T0 during which the current control processing is performed, whereas there is another case in which the voltage control processing is performed even in the standard calculation cycle T0 during which the current control processing is not performed. In the example of the present embodiment, the voltage control processing is structured so as to be performed only in the standard calculation cycle T0 during which the current control processing is performed if the carrier frequency Fc is 2.5 kHz or 1.25 kHz, and to be performed even in the standard calculation cycle T0 during which the current control processing is not performed if the carrier frequency Fc is 5 kHz, 7.5 kHz, or 10 kHz. The voltage control processing is structured as described above because it need not be performed a plurality of times in a half cycle of the carrier Ca. That is, for the carriers of low carrier frequencies (2.5 kHz and 1.25 kHz in the example of the present embodiment) Fc, the execution cycle (control cycle) of the voltage control processing is made longer than that of others so as not to be performed twice or more in the half cycle of the carrier Ca. Note that, as shown in FIGS. 7A to 11E, because the current control processing also need not be performed a plurality of times in the half cycle of the carrier Ca, the execution cycle (control cycle) of the current control processing is made longer than that of others for the carrier of a low carrier frequency (1.25 kHz in the example of the present embodiment) Fc. The execution cycles (control cycles) of the current control processing and the voltage control processing as described above can be adjusted by skipping unnecessary processing.

Note that the voltage control processing requires the detection result of the magnetic pole position $\theta$. Therefore, the structure may be such that the magnetic pole position detection processing is performed at every start point of the standard calculation cycle T0 during which the voltage control processing is performed. Alternatively, the structure may be such that the magnetic pole position detection processing is performed not at every start point of the standard calculation cycle T0 during which the voltage control processing is performed, but only at the start point of the standard calculation cycle T0 during which the current control processing is performed at the same timing as that of the current control processing. In the latter structure, the structure may be such that a predicted value based on the previous detection result of the magnetic pole position $\theta$ is used by the voltage control processing in the standard calculation cycle T0 in which the magnetic pole position detection processing is not performed at the start point thereof.

As described above, in the present embodiment, the relation of phase on the time axis between the carrier frequencies in each of the plurality of carrier frequency pairs, the execution schedule of the current detection processing, the execution schedule of the current control processing, and the execution schedule of the voltage control processing are set in advance for each of the carrier frequency pairs. As shown in FIGS. 7A to 11E, in the present embodiment, the standard calculation cycle T0 (100 [µs] in the example of the present embodiment) with which the timing of the current detection processing is synchronized is made constant regardless of the value of the carrier frequency Fc. Consequently, in order that both the relation of phase on the time axis between the carrier frequencies and the execution schedule of the current detection processing, etc., coincide with the predetermined relation and schedule, the switching timing needs to take into account not only the phase of each of the carriers Ca in the present carrier frequency pair but also the phase in the cycle at which the current detection processing is performed (hereinafter referred simply to as "current detection cycle"). Therefore, in the present embodiment, the switching timing table 100 specifies the switching timing based on the relation between the phase in the current detection cycle for each of the two electric motors MG and the phase of the carrier set for the inverter 6 corresponding to each of the electric motors MG. As a result, even if the cycle of the current detection processing differs from the cycle of the carrier, the switching timing can be specified by appropriately taking into account the relation between the timing of the current detection processing and the timing of the peak or the valley of the carrier.

The switching timings specified as described above will be supplementarily described based on several specific examples (switching operations for carrier frequency pairs indicated by reference numerals a to d shown in FIG. 6). Note that, in the description below, the phase of the carrier Ca is measured relative to a reference point (where the phase is "0") defined at each valley of the carrier waveforms, and the phases of the first carrier Ca1 and the second carrier Ca2 are denoted as $\phi ca1$ and $\phi ca2$, respectively. The phase in the current detection cycle is measured relative to a reference point (where the phase is "0") defined at each timing at which the current detection processing is performed, and the phase in the current detection cycle for the first electric motor MG1 and the phase in the current detection cycle for the second electric motor MG2 are denoted as $\phi i1$ and $\phi i2$, respectively.

Figure 7D:
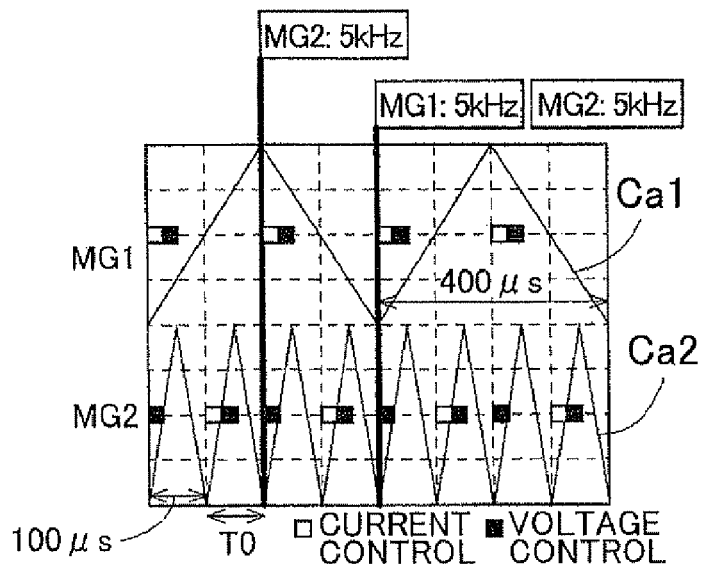
Figure 7E:
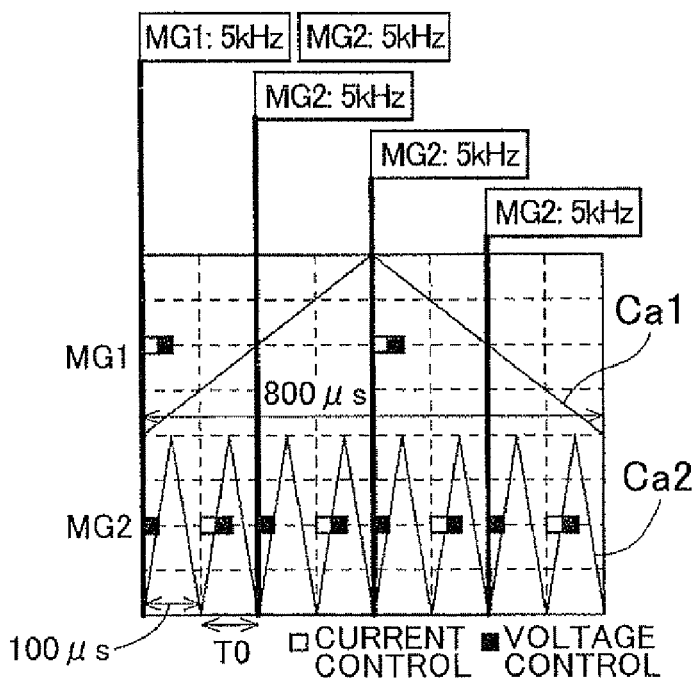
Figure 8A:
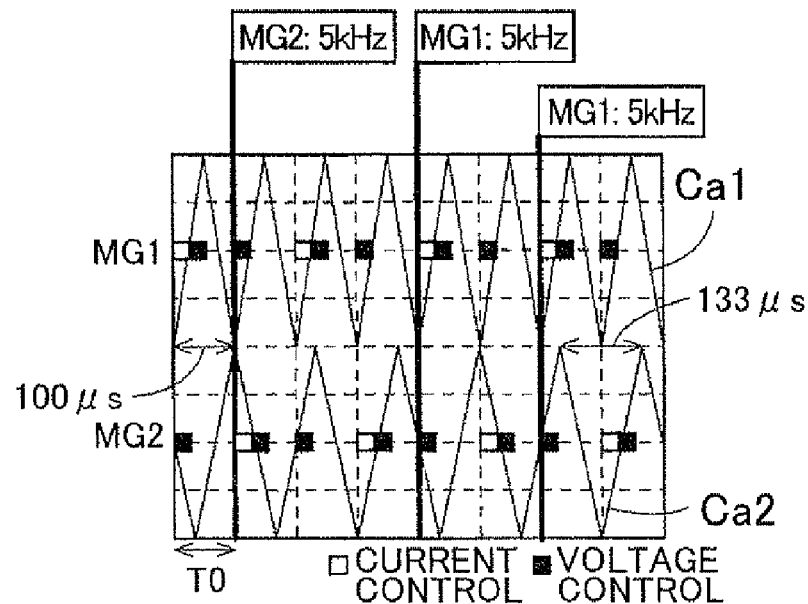
FIGS. 8A to 8E are diagrams conceptually showing the switching timing table according to the embodiment of the present invention.
Figure 8B:
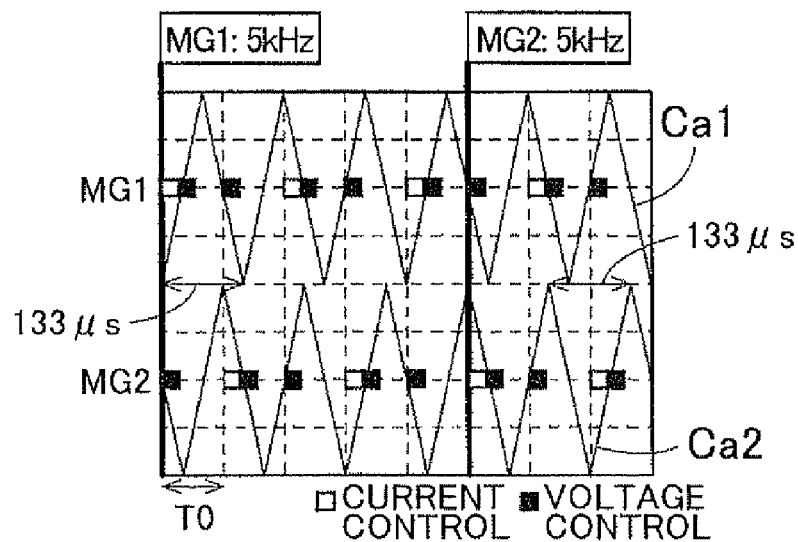
Figure 8C:
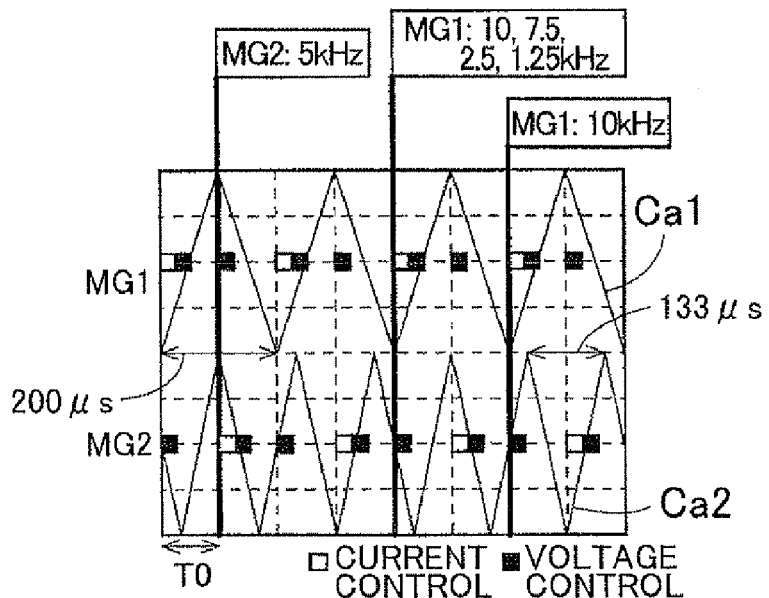
Figure 8D:
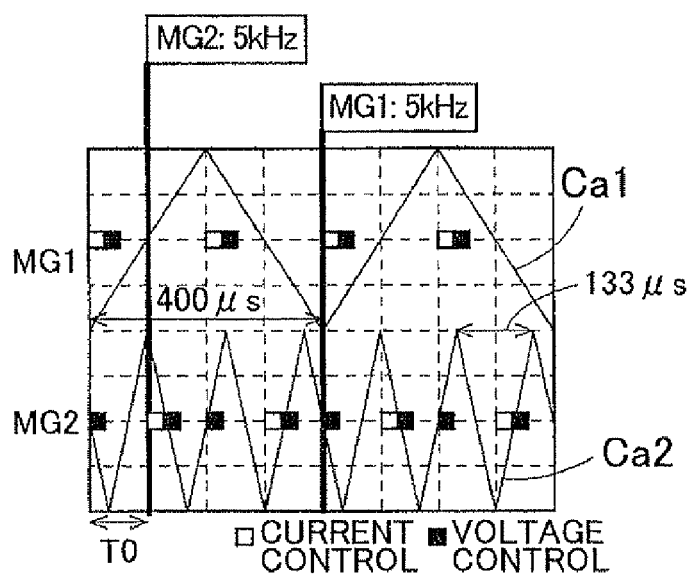
Figure 8E:
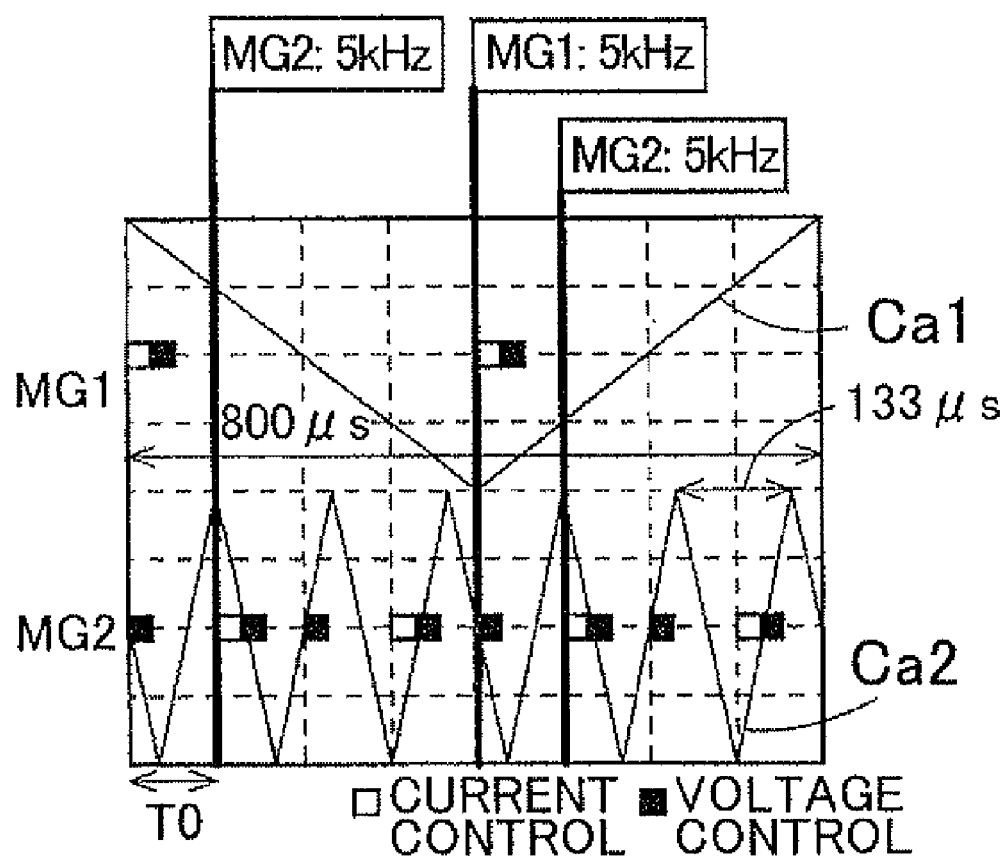

As shown in FIG. 7C, the switching timing indicated by reference numeral a shown in FIG. 6 from a carrier frequency pair (5 kHz, 10 kHz) to a carrier frequency pair (10 kHz, 10 kHz) is represented as $(\phi ca1, \phi ca2, \phi i1, \phi i2) = (0, 0, 0, \pi)$. It should be noted that, in the carrier frequency pair (5 kHz, 10 kHz), the cycle of the first carrier Ca1 is 200 µs, and $\phi ca1$ represents a phase on the assumption that the valley of the first carrier Ca1 is located at a phase of "0" and the cycle of 200 µs corresponds to a phase of $2\pi$. The cycle of the second carrier Ca2 is 100 µs, and $\phi ca2$ represents a phase on the assumption that the valley of the second carrier Ca2 is located at a phase of "0" and the cycle of 100 µs corresponds to a phase of $2\pi$.

The current detection cycle for the first electric motor MG1 is 200 μs, and φi1 represents a phase on the assumption that the time at which the current detection processing is performed (the time at which the left side of an outlined white rectangle representing the current control processing is located in the diagram) is located at a phase of "0" and the cycle of 200 μs corresponds to a phase of 2π. The current detection cycle for the second electric motor MG2 is 200 μs, and φi2 represents a phase on the assumption that the time at which the current detection processing is performed (the time at which the left side of an outlined white rectangle representing the current control processing is located in the diagram) is located at a phase of "0" and the cycle of 200 μs corresponds to a phase of 2π. Note that, as is obvious from FIG. 7C, the expression (φca1, φca2, φi1, φi2)=(0, 0, 0, π) is satisfied if φca1=0, φi1=0, or φi2=π for the carrier frequency pair (5 kHz, 10 kHz). Therefore, the switching timing for this switching operation can also be specified only by φca1, φi1, or φi2.

As shown in FIG. 7A, the switching timing indicated by reference numeral b shown in FIG. 6 from the carrier frequency pair (10 kHz, 10 kHz) to the carrier frequency pair (5 kHz, 10 kHz) is represented as (φca1, φca2, φi1, φi2)=(0, 0, 0, π), which represents the same as the switching timing from the carrier frequency pair (5 kHz, 10 kHz) to the carrier frequency pair (10 kHz, 10 kHz) described above. In the present embodiment, the switching timing between the carrier frequency pairs is the same regardless of the direction of switching because both the relation of phase on the time axis between the carrier frequencies and the execution schedule of the current detection processing are set in advance for each of the carrier frequency pairs. Note that, as is obvious from FIG. 7A, the expression (φca1, φca2, φi1, φi2)=(0, 0, 0, π) is satisfied if φi1=0 or φi2=π for the carrier frequency pair (10 kHz, 10 kHz). Therefore, the switching timing for this switching operation can also be specified only by φi1 or φi2.

As shown in FIG. 9A, the switching timing indicated by reference numeral c shown in FIG. 6 from a carrier frequency pair (10 kHz, 5 kHz) to a carrier frequency pair (10 kHz, 1.25 kHz) is represented as (φca1, φca2, φi1, φi2)=(0, π, π, 0). Note that, as is obvious from FIG. 9A, the expression (φca1, φca2, φi1, φi2)=(0, π, π, 0) is satisfied if φca2=π, φi1=π, or φi2=0 for the carrier frequency pair (10 kHz, 5 kHz). Therefore, the switching timing for this switching operation can also be specified only by φca2, φi1, or φi2.

Figure 11A:
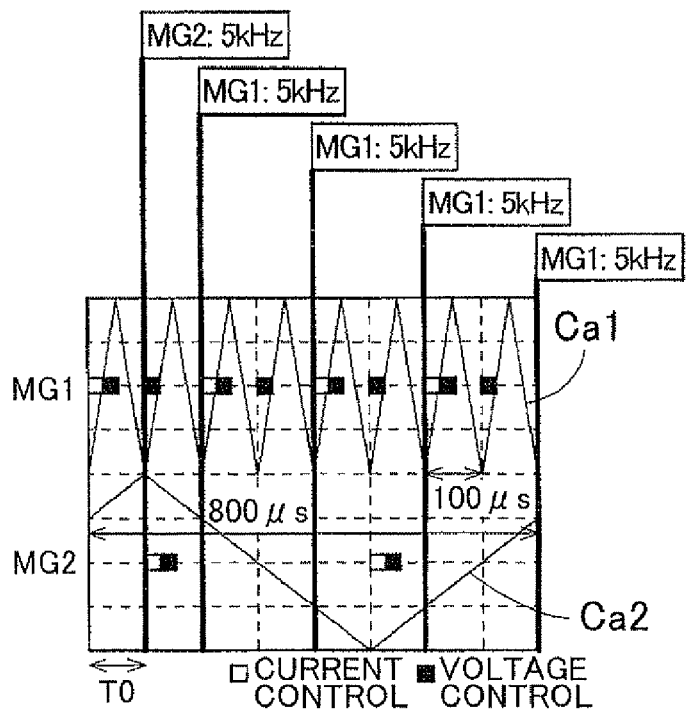
FIGS. 11A to 11E are diagrams conceptually showing the switching timing table according to the embodiment of the present invention.
Figure 11B:
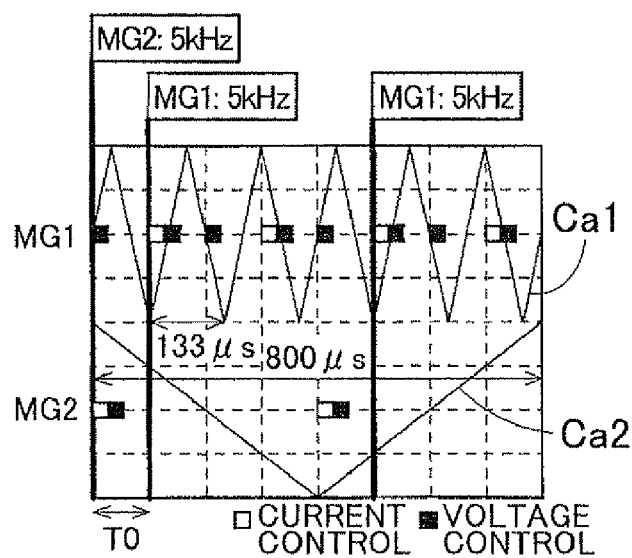
Figure 11C:
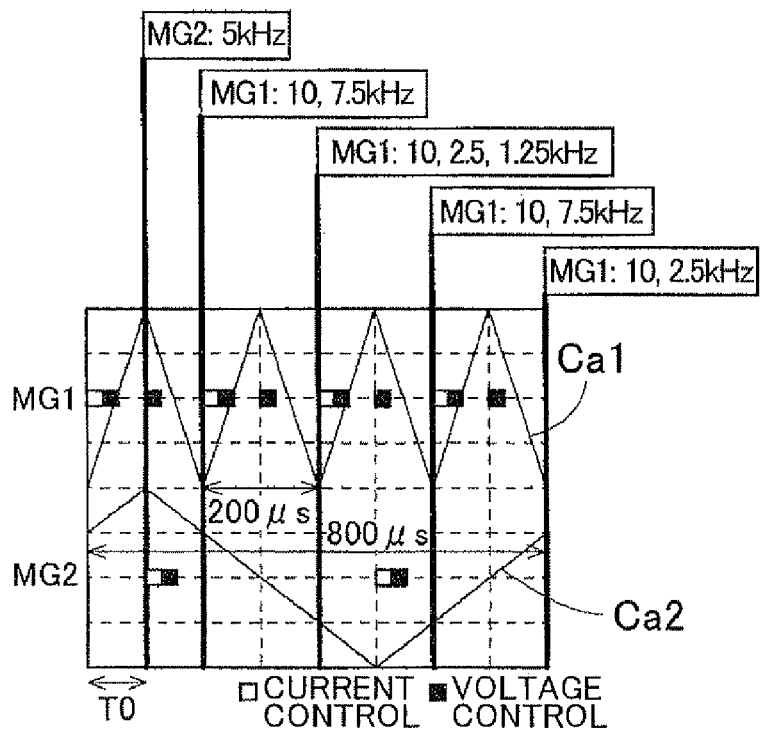
Figure 11D:
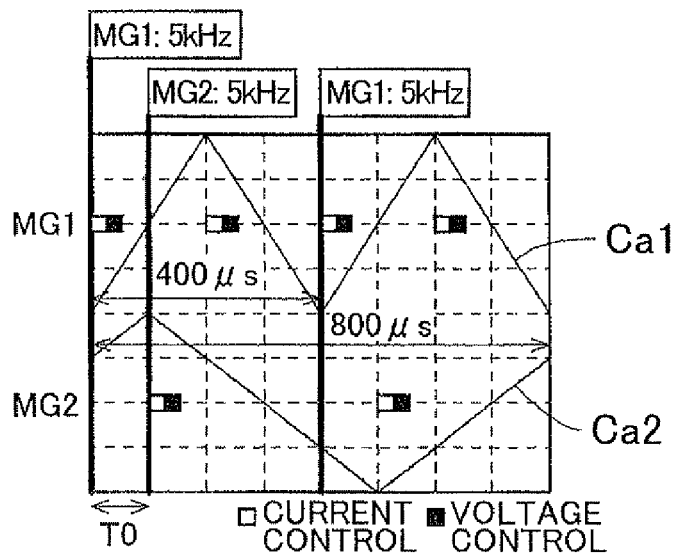
Figure 11E:
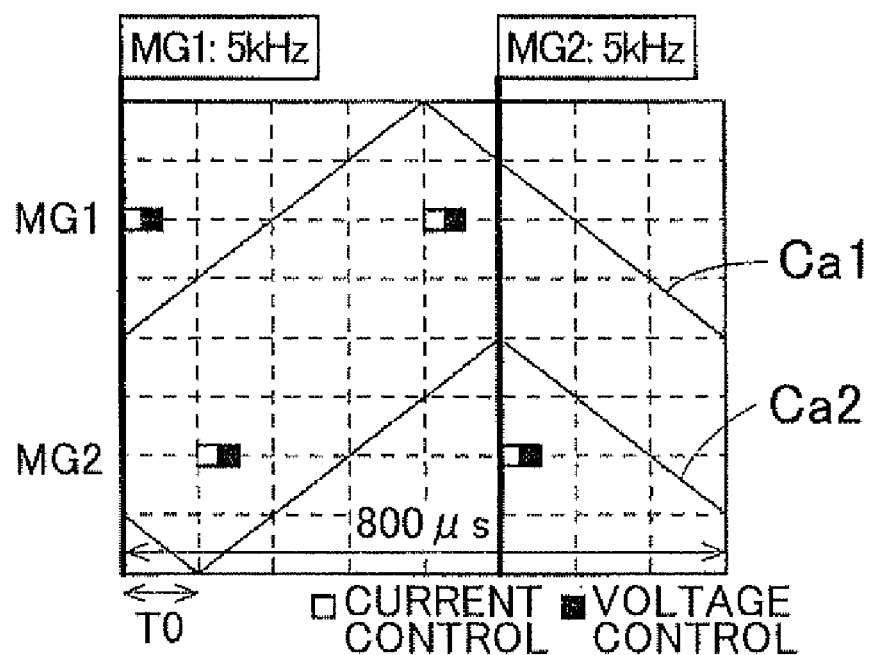

As shown in FIG. 11A, the switching timing indicated by reference numeral d shown in FIG. 6 from the carrier frequency pair (10 kHz, 1.25 kHz) to the carrier frequency pair (10 kHz, 5 kHz) is represented as (φca1, φca2, φi1, φi2)=(0, π, π, 0), which represents the same as the switching timing from the carrier frequency pair (10 kHz, 5 kHz) to the carrier frequency pair (10 kHz, 1.25 kHz) described above. Note that, as is obvious from FIG. 11A, the expression (φca1, φca2, φi1, φi2)=(0, π, π, 0) is satisfied if φca2=π for the carrier frequency pair (10 kHz, 1.25 kHz). Therefore, the switching timing for this switching operation can also be specified only by φca2.

As described above, in the present embodiment, the switching timing between the carrier frequency pairs is the same regardless of the direction of switching because both the relation of phase on the time axis between the carrier frequencies and the execution schedule of the current detection processing are set in advance for each of the carrier frequency pairs. Also from this point of view, the number of the switching timings specified by the switching timing table 100 can be limited.

In should be noted that, although the switching timing is specified based on the relation between each of the phases φi1 and φi2 in the current detection cycle for each of the two electric motors MG and each of the phases φca1 and φca2 of each of the carriers Ca1 and Ca2 set for the inverter 6 corresponding to each of the electric motors MG, not necessarily all of the four parameters (φca1, φca2, φi1, φi2) are required for specifying the switching timings depending on the carrier frequency pair before switching and the carrier frequency pair after switching, as described above. The reason for that is that both the relation of phase on the time axis between the carrier frequencies in each of the plurality of carrier frequency pairs and the execution schedule of the current detection processing, etc., are set in advance for each of the carrier frequency pairs, as described above. Therefore, even if not all of the four parameters are required, it can be said that the switching timings are specified based on the relation among all of the four parameters, when interpreted in a broad sense. That is, the expression "specifying the switching timing based on the relation between the phase in the cycle of the current detection processing for each of the plurality of alternating-current electric motors and the phase of the carrier set for the inverter corresponding to each of the alternating-current electric motors" in the present invention represents a concept including the case in which the switching timings are specified by not all of the four parameters (φca1, φca2, φi1, φi2) (that is, by some of the four parameters).

Although the structure of the switching timing table 100 has been described above based on FIGS. 7A to 11E, the relation of phase on the time axis between the carrier frequencies in each of the carrier frequency pairs and the execution schedule of the current control processing, voltage control processing, and the current detection processing shown in FIGS. 7A to 11E are only an example, and can be modified as appropriate. It is preferable to set the relation of phase on the time axis between the carrier frequencies from the viewpoint of whether or not the electric motor MG operates as a generator and of reduction of the current ripple. It is also preferable to set the execution cycle (control cycle) of the current control processing and the current detection processing from the viewpoint of setting the cycle to a sufficiently small value relative to the time constant of the electric motor MG. It is also preferable to set the execution cycle (control cycle) of the voltage control processing depending on the maximum rotational speed within the operating range of the electric motor MG. For example, it is preferable to set the execution cycle (control cycle) of the voltage control processing to approximately one tenth of the cycle of the alternating-current voltage command values corresponding to the maximum rotational speed within the operating range of the electric motor MG.

4. Other Embodiments (1) In the embodiment described above, description has been made of the examples where the carrier frequency setting unit 52 performs frequency switching through the standard carrier frequency (5 kHz in the above-described example) when switching between carrier frequencies other than the standard carrier frequency. However, embodiments of the present invention are not limited to this case. That is, a preferable embodiment of the present invention may have a structure in which the carrier frequency setting unit 52 performs frequency switching without passing through the standard carrier frequency when switching from a carrier frequency of N times (where N is an integer of two or more) the standard carrier frequency to a carrier frequency other than the standard carrier frequency. This structure is a preferable in the case in which the switching timing from the carrier frequency of N times (where N is an integer of two or more) the standard carrier frequency to the standard carrier frequency coincides with the switching timing from the standard carrier frequency to the carrier frequency other than the standard carrier frequency.

That is, in the examples shown in FIGS. 7A to 11E, when the carrier frequency Fc2 is assumed to be constant, any of the switching timings of switching from the carrier frequency pair with the carrier frequency Fc1 of 5 kHz to that with the carrier frequency Fc1 of 7.5 kHz, 2.5 kHz, or 1.25 kHz is structured so as to coincide with the switching timing to switch the carrier frequency Fc1 from 10 kHz to 5 kHz. In such a case, when, for example, switching from the carrier frequency pair (10 kHz, 5 kHz) to a carrier frequency pair (2.5 kHz, 5 kHz), the switching can be accomplished from the carrier frequency pair (10 kHz, 5 kHz) to the carrier frequency pair (2.5 kHz, 5 kHz) without passing through the carrier frequency pair (5 kHz, 5 kHz), based on the switching timing $(\phi ca1, \phi ca2, \phi i1, \phi i2)=(0, 0, 0, \pi)$ to the carrier frequency pair (2.5 kHz, 5 kHz) specified for the carrier frequency pair (5 kHz, 5 kHz). Therefore, the carrier frequency can be switched quickly while limiting the number of the switching timings provided in the switching timing table 100 to a small value.

(2) In the embodiment described above, description has been made of the examples where the carrier frequency setting unit 52 performs frequency switching through the standard carrier frequency (5 kHz in the above-described example) when switching between carrier frequencies other than the standard carrier frequency. However, it is also preferable to have a structure in which the switching timing table 100 has a switching timing of switching without passing through the standard carrier frequency, and the carrier frequency setting unit 52 performs frequency switching between carrier frequencies other than the standard carrier frequency without passing through the standard carrier frequency.

(3) In the embodiment described above, description has been made of the examples where the standard carrier frequency is 5 kHz, and the standard calculation cycle T0 equals to a half of the cycle of the carrier Ca corresponding to the standard carrier frequency. However, embodiments of the present invention are not limited to this case. The standard carrier frequency and the standard calculation cycle T0 can be set independently from each other. It is preferable to set the standard carrier frequency, for example, to a carrier frequency often selected by the carrier frequency setting unit 52. Because the standard calculation cycle T0 is used for setting the minimum cycle in which the voltage control processing can be performed, it is preferable to set the standard calculation cycle T0 to a suitable cycle of the voltage control processing at the maximum rotational speed within the operating range of the electric motor MG.

(4) In the embodiment described above, description has been made of the examples where the switching timing table 100 does not specify the switching timing for switching the carrier frequencies Fc1 and Fc2 at the same time. However, embodiments of the present invention are not limited to this case. Accordingly, a preferable embodiment of the present invention may have a structure in which, for example, the switching timing table 100 also specifies the switching timing for switching the carrier frequencies Fc1 and Fc2 at the same time, and the carrier frequency setting unit 52 can switch the carrier frequencies Fc1 and Fc2 at the same time.

(5) In the embodiment described above, description has been made of the examples where the relation of phase on the time axis between the carrier frequencies composing the carrier frequency pair is set to a predetermined relation in advance for each of the carrier frequency pairs, and the switching timing table 100 specifies the switching timing between the carrier frequency pairs, for each of which the relation of phase on the time axis between the carrier frequencies is set to the predetermined relation in advance. However, embodiments of the present invention are not limited to this case. Accordingly, a preferable embodiment of the present invention may have a structure in which, for example, instead of uniquely determining for one carrier frequency pair a relation of phase on the time axis between carrier frequencies composing the carrier frequency pair, a plurality of alternatives are provided to be selected depending on the operating state of the electric motor MG (for example, operating point determined by torque, rotational speed, etc. and whether or not serving as a generator) corresponding to each of the carrier frequencies, and the switching timing table 100 specifies a plurality of timings selectable depending on the operating state of the electric motor MG when switching to the same carrier frequency pair.

(6) In the embodiment described above, description has been made of the examples where the switching timing table 100 specifies the switching timing based on the relation between the phase in the cycle of the current detection processing for each of the plurality of electric motors MG and the phase of the carrier Ca that is set for the inverter 6 corresponding to each of the electric motors MG. However, embodiments of the present invention are not limited to this case. Accordingly, a preferable embodiment of the present invention may have a structure in which, for example, the switching timing table 100 specifies the switching timing based on a relation among phases including not only the phase in the cycle of the current detection processing for each of the plurality of electric motors MG and the phase of the carrier Ca that is set for the inverter 6 corresponding to each of the electric motors MG, but also phases in other cycles of control processing, such as magnetic pole position detection processing, for the electric motor MG.

(7) In the embodiment described above, description has been made of the examples where the carrier frequency setting unit 52 is structured so as to individually set a carrier frequency selected from the five carrier frequencies, 1.25 kHz, 2.5 kHz, 5 kHz, 7.5 kHz, and 10 kHz, for each of the two inverters 6a and 6b. However, embodiments of the present invention are not limited to this case. The settings of the frequencies settable by the carrier frequency setting unit 52 and of the carrier frequency pairs for which the switching timing table 100 specifies the switching timings can be modified as appropriate.

(8) In the embodiment described above, description has been made of the examples where the carrier Ca is a triangular wave. However, embodiments of the present invention are not limited to this case. The carrier Ca is also preferably structured to be, for example, a sawtooth wave.

(9) In the embodiment described above, description has been made of the examples where the current control processing to perform the current feedback control calculation is executed within the standard calculation cycle T0 immediately after the current detection processing that is executed in accordance with the maximum value or the minimum value of the carrier Ca. However, The current control processing may be structured so as to be executed within the standard calculation cycle T0 after the standard calculation cycle T0 has passed immediately after the current detection processing.

(10) In the embodiment described above, description has been made of the examples where the electric motor drive apparatus 1 controls the two electric motors MG1 and MG2, and has the two inverters 6a and 6b corresponding to the two electric motors MG1 and MG2, respectively, while the control device 2 is structured so as to control the two electric motors MG1 and MG2 by controlling the two inverters 6a and 6b. In that case, in the examples thus described, the control device 2 is structured so as to control the two electric motors MG1 and MG2 by using the single CPU core 62. However, embodiments of the present invention are not limited to this case. Accordingly, a preferable embodiment of the present invention may have a structure in which, for example, assuming X as an integer of three or more, the electric motor drive apparatus 1 controls X electric motors MG, and has X inverters 6 corresponding to the X electric motors MG, respectively, while the control device 2 is structured so as to control the X electric motors MG by controlling the X inverters 6.

(11) In the embodiment described above, description has been made of the examples where the present invention is applied to the control device 2 of the electric motor drive apparatus 1 that controls the electric motors MG used as a source of driving force of an electric vehicle or a hybrid vehicle. However, embodiments of the present invention are not limited to this case. That is, the present invention can be applied to control any device or equipment that controls alternating-current electric motors.

The present invention can preferably be used for a control device that controls a plurality of inverters respectively provided corresponding to a plurality of alternating-current electric motors so as to control the plurality of alternating-current electric motors by current feedback.

What is claimed is:

1. A control device that controls a plurality of inverters respectively provided corresponding to a plurality of alternating-current electric motors so as to control the plurality of alternating-current electric motors by current feedback, wherein:
current detection processing to detect currents flowing in coils of each of the plurality of alternating-current electric motors is cyclically performed at times synchronized with a predetermined standard calculation cycle and mutually different from each other;
the control device comprises
a carrier frequency setting unit that individually selects and sets one of a plurality of carrier frequencies, each of which is a frequency of a carrier for generating switching control signals for the inverter based on a pulse width modulation method, for each of the plurality of inverters, and
a switching timing table that specifies a switching timing serving as a permissible timing of switching to a different carrier frequency pair from each of a plurality of carrier frequency pairs each of which is composed of a combination of the carrier frequencies set for each of the plurality of inverters;
the switching timing table is a table specifying the switching timing so that the current detection processing for each of the plurality of alternating-current electric motors is performed in accordance with a maximum value or a minimum value of the carrier that is set for the inverter corresponding to each of the alternating-current electric motors; and
the carrier frequency setting unit switches the setting of the carrier frequency based on the switching timing obtained from the switching timing table.

2. The control device according to claim 1, wherein the switching timing table specifies the switching timing based on a relation between a phase in a cycle of the current detection processing for each of the plurality of alternating-current electric motors and a phase of the carrier that is set for the inverter corresponding to each of the alternating-current electric motors.

3. The control device according to claim 1, wherein the switching timing table specifies the switching timing so that a relation of phase on a time axis between the carrier frequencies in each of the plurality of carrier frequency pairs coincides with a predetermined relation for each of the carrier frequency pairs.

4. The control device according to claim 1, wherein
the switching timing table is provided for both a timing of switching from a predetermined standard carrier frequency to other carrier frequency and a timing of switching from the carrier frequency other than the standard carrier frequency to the standard carrier frequency, and
the carrier frequency setting unit performs frequency switching through the standard carrier frequency when switching between carrier frequencies other than the standard carrier frequency.

5. The control device according to claim 4, wherein the carrier frequency setting unit performs frequency switching without passing through the standard carrier frequency when switching from a carrier frequency of N times (where N is an integer of two or more) the standard carrier frequency to a carrier frequency other than the standard carrier frequency.

6. The control device according to claim 1, wherein current control processing, in which current feedback control calculation is performed based on deviations between current command values determined based on a required torque for each of the alternating-current electric motors and current detection values detected by the current detection processing, is executed within the standard calculation cycle immediately after the current detection processing that is executed in accordance with the maximum value or the minimum value of the carrier.

* * * * *